US012784489B2

(12) United States Patent
Kimura

(10) Patent No.: US 12,784,489 B2
(45) Date of Patent: Nov. 3, 2026

(54) IMAGE PROCESSING APPARATUS, CONTROL METHOD THEREFOR, AND NON-TRANSITORY COMPUTER-READABLE STORAGE MEDIUM STORING A COMPUTER PROGRAM

(71) Applicant: CANON KABUSHIKI KAISHA, Tokyo (JP)

(72) Inventor: Takato Kimura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 285 days.

(21) Appl. No.: 18/638,899

(22) Filed: Apr. 18, 2024

(65) Prior Publication Data

US 2024/0362947 A1 Oct. 31, 2024

(30) Foreign Application Priority Data

Apr. 26, 2023 (JP) ................................ 2023-072672

(51) Int. Cl.
*G06V 40/10* (2022.01)
*G06T 3/047* (2024.01)
(Continued)

(52) U.S. Cl.
CPC ............ *G06V 40/103* (2022.01); *G06T 3/047* (2024.01); *G06T 7/60* (2013.01); *G06T 7/73* (2017.01);
(Continued)

(58) Field of Classification Search
CPC .. G06V 40/103; G06V 2201/07; G06V 40/10; G06V 10/242; G06V 10/25;
(Continued)

(56) References Cited

U.S. PATENT DOCUMENTS

| | | | | |
|---|---|---|---|---|
| 7,769,233 B2 * | 8/2010 | Enomoto | .............. | G06T 7/0002 382/167 |
| 8,064,655 B2 * | 11/2011 | Hatano | ................ | G06V 40/161 382/296 |

(Continued)

FOREIGN PATENT DOCUMENTS

| | | | | |
|---|---|---|---|---|
| CN | 103210421 A | * 7/2013 | ........... | G06V 40/103 |
| CN | 108875723 A | * 11/2018 | ........... | G06V 10/243 |

(Continued)

OTHER PUBLICATIONS

Li et al., "Supervised People Counting Using An Overhead Fisheye Camera", 2019, IEEE, pp. 1-8 (Year: 2019).*

(Continued)

*Primary Examiner* — John Villecco
*Assistant Examiner* — Rachel Y Dang
(74) *Attorney, Agent, or Firm* — Carter, DeLuca & Farrell LLP

(57) ABSTRACT

An image processing apparatus for detecting a person region representing a person in an image comprises one or more memories storing instructions; and one or more processors executing the instructions to obtain an image, generate a plurality of rotated images by rotating an obtained image by a plurality of preset angles, execute person detection processing on each one of the plurality of rotated images and obtain detection information including information indicating a candidate region of a detected person and information indicating a likelihood as a person in the candidate region, and using detection information obtained via detection of the detected person, determine a candidate region to be removed from a person region in accordance with each likelihood and remove the candidate region.

7 Claims, 22 Drawing Sheets

(51) Int. Cl.

| | |
|---|---|
| ***G06T 7/60*** | (2017.01) |
| ***G06T 7/73*** | (2017.01) |
| ***H04N 23/58*** | (2023.01) |
| ***H04N 23/611*** | (2023.01) |

(52) U.S. Cl.
CPC ........... *H04N 23/58* (2023.01); *H04N 23/611* (2023.01); *G06V 2201/07* (2022.01)

(58) Field of Classification Search
CPC .. G06T 7/73; G06T 3/047; G06T 7/60; G06T 3/60; H04N 23/611
See application file for complete search history.

(56) References Cited

U.S. PATENT DOCUMENTS

| | | | | |
|---|---|---|---|---|
| 2019/0384969 | A1* | 12/2019 | Shimauchi | G06T 7/248 |
| 2023/0018589 | A1* | 1/2023 | Piao | G06V 10/764 |
| 2023/0077498 | A1 | 3/2023 | Kimura | |
| 2024/0071130 | A1 | 2/2024 | Kimura | |

FOREIGN PATENT DOCUMENTS

| | | | | | |
|---|---|---|---|---|---|
| EP | 2816502 | A1 | * | 12/2014 | G06V 10/95 |
| JP | 2004282535 | A | * | 10/2004 | G06T 7/00 |
| JP | 5385182 | B2 | * | 1/2014 | G06T 7/00 |
| JP | 7066122 | B2 | | 5/2022 | |

OTHER PUBLICATIONS

Wang et al., "YOLOv7: Trainable bag-of-freebies sets new state-of-the-art for real-time object detectors", 2022 (Year: 2022).*

Mittal et al., "M2Tracker: A Multi-View Approach to Segmenting and Tracking People in a Cluttered Scene Using Region-Based Stereo", Springer-Verlag Berlin Heidelberg, 2002 (Year: 2002).*

Brueuer et al., "Automatic 3D face reconstruction from single images or video," 2008 8th IEEE International Conference on Automatic Face & Gesture Recognition, Amsterdam, Netherlands, 2008, pp. 1-8, doi: 10.1109/AFGR.2008.4813339. (Year: 2008).*

Extended European Search Report issued by the European Patent Office on Aug. 22, 2024 in corresponding EP Patent Application No. 24170417.0.

Tang, J. et al., "PHD: A Deep Learning Based Human Detection Framework for Panoramic Videos" 11th International Conference on Wireless Communications and Signal Processing (WCSP), IEEE, (Oct. 2019), pp. 1-6, XP033671932.

Li, S. et al., "Supervised People Counting Using An Overhead Fisheye Camera" 2019 16th IEEE International Conference on Advanced Video and Signal Based Surveillance (AVSS), IEEE, (Sep. 2019) pp. 1-8, XP033642125.

Wang, C.-Y. et al., "YOLOv7: Trainable bag-of-freebies sets new state-of-the-art for real-time object detectors" arXiv:2207.02696v1 (Jul. 2022) pp. 1-15.

* cited by examiner

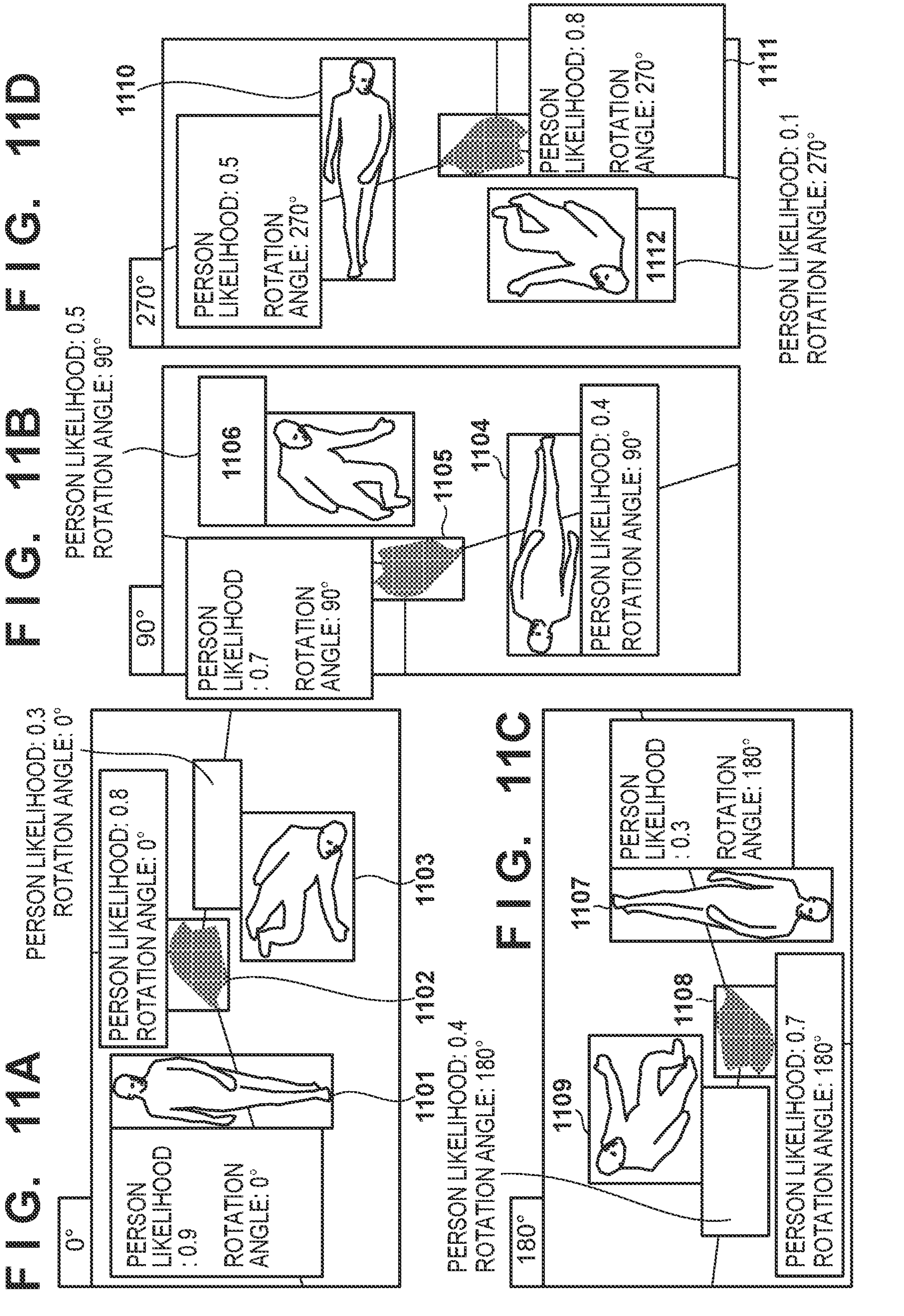
FIG. 11A
0°
PERSON LIKELIHOOD : 0.9
ROTATION ANGLE: 0°
PERSON LIKELIHOOD: 0.8
ROTATION ANGLE: 0°
PERSON LIKELIHOOD: 0.3
ROTATION ANGLE: 0°
1101
1102
1103
FIG. 11B
90°
PERSON LIKELIHOOD : 0.7
ROTATION ANGLE: 90°
PERSON LIKELIHOOD: 0.5
ROTATION ANGLE: 90°
PERSON LIKELIHOOD: 0.4
ROTATION ANGLE: 90°
1104
1105
1106
FIG. 11C
180°
PERSON LIKELIHOOD: 0.4
ROTATION ANGLE: 180°
PERSON LIKELIHOOD : 0.3
ROTATION ANGLE: 180°
PERSON LIKELIHOOD: 0.7
ROTATION ANGLE: 180°
1107
1108
1109
FIG. 11D
270°
PERSON LIKELIHOOD: 0.5
ROTATION ANGLE: 270°
PERSON LIKELIHOOD: 0.8
ROTATION ANGLE: 270°
PERSON LIKELIHOOD: 0.1
ROTATION ANGLE: 270°
1110
1111
1112

2100

| LABEL | TARGET REMOVAL ROTATION ANGLE |
|---|---|
| 1 | OTHERWISE 0° |
| 2 | OTHERWISE 90° |
| 3 | OTHERWISE 180° |
| 4 | OTHERWISE 270° |

IMAGE PROCESSING APPARATUS, CONTROL METHOD THEREFOR, AND NON-TRANSITORY COMPUTER-READABLE STORAGE MEDIUM STORING A COMPUTER PROGRAM

BACKGROUND OF THE INVENTION

Field of the Invention

The present invention relates to an image processing apparatus, a control method therefor, and a non-transitory computer-readable storage medium storing a computer program.

Description of the Related Art

Person detection techniques for detecting in images are techniques that detect a person box (typically, a bounding box) that encloses a person region of an object in an image. This technique is used in human behavior recognition and people counting. Many person detection techniques using machine learning have been proposed in recent years. Among these, a method using a person detection model using a deep neural network (hereinafter, referred to as "DNN") has shown high recognition accuracy (Wang, Chien-Yao, Alexey Bochkovskiy, and Hong-Yuan Mark Liao. "YOLOv7: Trainable bag-of-freebies sets new state-of-the-art for real-time object detectors." arXiv preprint arXiv: 2207.02696 (2022), hereinafter, referred to as Document "Wang").

A person detection model is obtained by learning from training data including pairs of an image showing a person (hereinafter, referred to as a person image) and a correct answer label corresponding to a person box of a person. The person posture that is detectable by the person detection model is limited to person postures sufficiently included in the training data. For example, typically, people being imaged in an upright posture is relatively common, but people being imaged in a horizontal posture is relatively uncommon and is thus not sufficiently included in training data. Accordingly, person detection for people in an upright posture is easy, but person detection for people in a person posture that is not sufficiently included in the training data, such as a horizontal posture, is difficult. To solve this, one plausible method includes generating training data of people in a horizontal posture. However, this requires person boxes of people in images to be manually generated as correct answer labels for a large number of images. The cost in terms of manpower for this task is high, and building sufficient training data is not easy.

A plausible method for enabling person detection of person postures that are difficult for person detection such as a horizontal posture includes a method in which images are rotated, images of people in an upright posture that is easy for person detection are artificially generated, and person detection is performed on these images. Japanese Patent No. 7066122 is an example of a technique for deducing the position of a person by rotating an image. In the technique proposed in Japanese Patent No. 7066122, a plurality of rotated images obtained by rotating a person image are generated, posture deduction is performed on the plurality of rotated images to deduce the position of the joints of a person in the images as the posture, and the positions of the joints with the highest reliability are output.

However, when the posture deduction technique of Document "Wang" is applied to person detection, a plurality of rotated images of the person images are generated, person detection is performed on the plurality of rotated images, and the person boxes with the highest reliability are output. In this case, false detection may occur in each rotated image. Thus, compared to not using a plurality of rotated images, the percentage of false detections is increased.

SUMMARY OF THE INVENTION

The present invention has been made in consideration of the aforementioned problems and realizes a technique for suppressing an increase in false detections and increasing the detection accuracy of person detection for person postures that are difficult for person detection.

According to an aspect of the present invention, there is provided an image processing apparatus for detecting a person region representing a person in an image, comprising: one or more memories storing instructions; and one or more processors executing the instructions to: obtain an image; generate a plurality of rotated images by rotating an obtained image by a plurality of preset angles; execute person detection processing on each one of the plurality of rotated images and obtain detection information including information indicating a candidate region of a detected person and information indicating a likelihood as a person in the candidate region; and using detection information obtained via detection of the detected person, determine a candidate region to be removed from a person region in accordance with each likelihood and remove the candidate region.

According to another aspect of the present invention, there is provided a control method for an image processing apparatus for detecting a person region representing a person in an image, comprising: obtaining an image; generating a plurality of rotated images by rotating an obtained image by a plurality of preset angles; executing person detection processing on each one of the plurality of rotated images and obtaining detection information including information indicating a candidate region of a detected person and information indicating a likelihood as a person in the candidate region; and using detection information obtained via detection of the detected person, determining a candidate region to be removed from a person region in accordance with each likelihood and removing the candidate region.

According to further aspect of the present invention, there is provided a non-transitory computer-readable storage medium storing a computer program that when read and executed by a computer provided in an image processing apparatus for detecting a person region representing a person in an image, causes the computer to obtain an image; generate a plurality of rotated images by rotating an obtained image by a plurality of preset angles; execute person detection processing on each one of the plurality of rotated images and obtain detection information including information indicating a candidate region of a detected person and information indicating a likelihood as a person in the candidate region; and using detection information obtained via detection of the detected person, determine a candidate region to be removed from a person region in accordance with each likelihood and removing the candidate region.

Further features of the present invention will become apparent from the following description of exemplary embodiments (with reference to the attached drawings).

BRIEF DESCRIPTION OF THE DRAWINGS

FIG. 11A is a schematic view illustrating a person detection result according to the second embodiment.

FIG. 11B is a schematic view illustrating a person detection result for a rotated image rotated 90 degrees according to the second embodiment.

FIG. 11C is a schematic view illustrating a person detection result for a rotated image rotated 180 degrees according to the second embodiment.

FIG. 11D is a schematic view illustrating a person detection result for a rotated image rotated 270 degrees according to the second embodiment.

DESCRIPTION OF THE EMBODIMENTS

Figure 1:
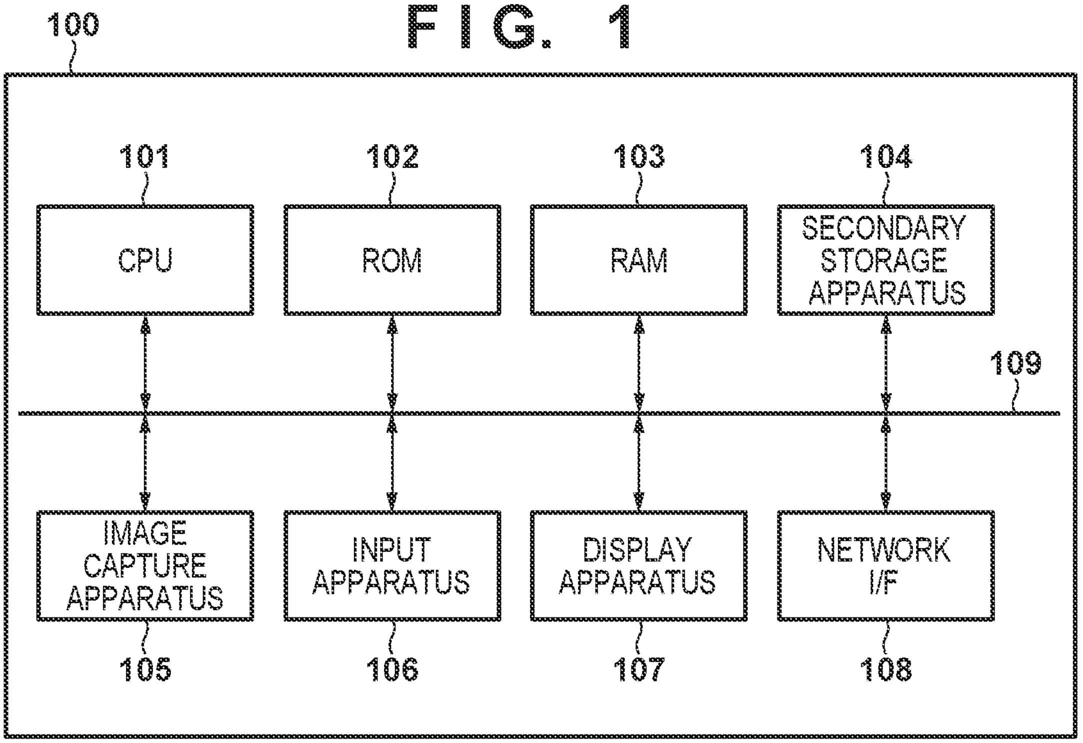
FIG. 1 is a block diagram illustrating an example of the hardware configuration of an image processing apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In the processing of the present embodiment described herein, person detection is performed on a plurality of rotated images obtained by rotation of a plurality of rotation angles and person boxes with a high false detection possibility are removed from person boxes obtained from rotated images of a predetermined rotation angle.

FIG. 1 is a block diagram illustrating an example of the hardware configuration of an image processing apparatus 100 according to the first embodiment.

The image processing apparatus 100 includes a CPU 101, ROM 102, RAM 103, a secondary storage apparatus 104, an image capture apparatus 105, an input apparatus 106, a display apparatus 107, a network I/F 108, and a bus 109 that connects these so that they are able to communicate.

The CPU 101 executes commands in accordance with programs stored in the ROM 102 and RAM 103. The ROM 102 is non-volatile memory (for example, EEPROM) and stores a program for the present embodiment and programs and data required for other control. The RAM 103 is volatile memory and stores transient data such as image data and person detection results.

The secondary storage apparatus 104 is a rewritable secondary storage apparatus such as a hard disk drive or flash memory and stores image information, programs, various types of settings content, and the like. This information is transferred to the RAM 103, and the CPU 101 executes programs and uses data.

The image capture apparatus 105 is constituted by an image capturing lens, an imaging sensor such as CCD or CMOS, a video signal processing unit, and the like and captures video (30 frames per second).

The input apparatus 106 is a keyboard and mouse, for example, and transfers instruction inputs from a user to the CPU 101.

The display apparatus 107 is a Braun tube CRT or liquid crystal display and displays to the user processing results and the like. For example, the display apparatus 107 displays a list of four images illustrated in FIGS. 7A to 7D described below in detail and displays frames indicating a person has been detected, likelihood, and rotation angle superimposed.

The network I/F 108 is a modem or LAN interface for connecting to a network such as the Internet or an intranet. Note that the type of communication may be wired or wireless.

The CPU 101 loads software containing processing corresponding to each step of the flowchart described below from the secondary storage apparatus 104 onto the RAM 103 and executes the software.

Figure 2:
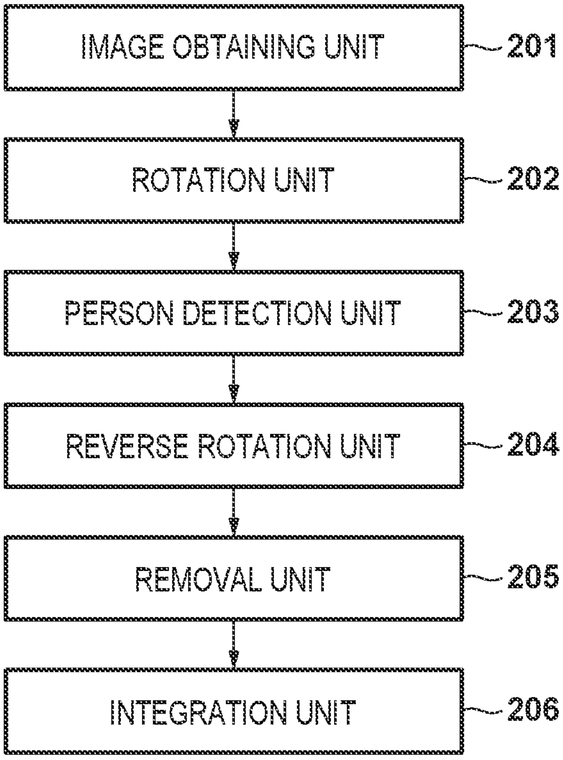
FIG. 2 is a block diagram illustrating an example of the functional configuration of the image processing apparatus according to the first embodiment.

FIG. 2 is a functional configuration diagram of software for image processing according to this embodiment being executed by the CPU 101. In this state, the image processing apparatus 100 includes an image obtaining unit 201, a rotation unit 202, a person detection unit 203, a reverse rotation unit 204, a removal unit 205, and an integration unit 206. Note that a part of the illustrated configuration may be implemented by a dedicated circuit or the like instead of the CPU 101.

Figure 3:
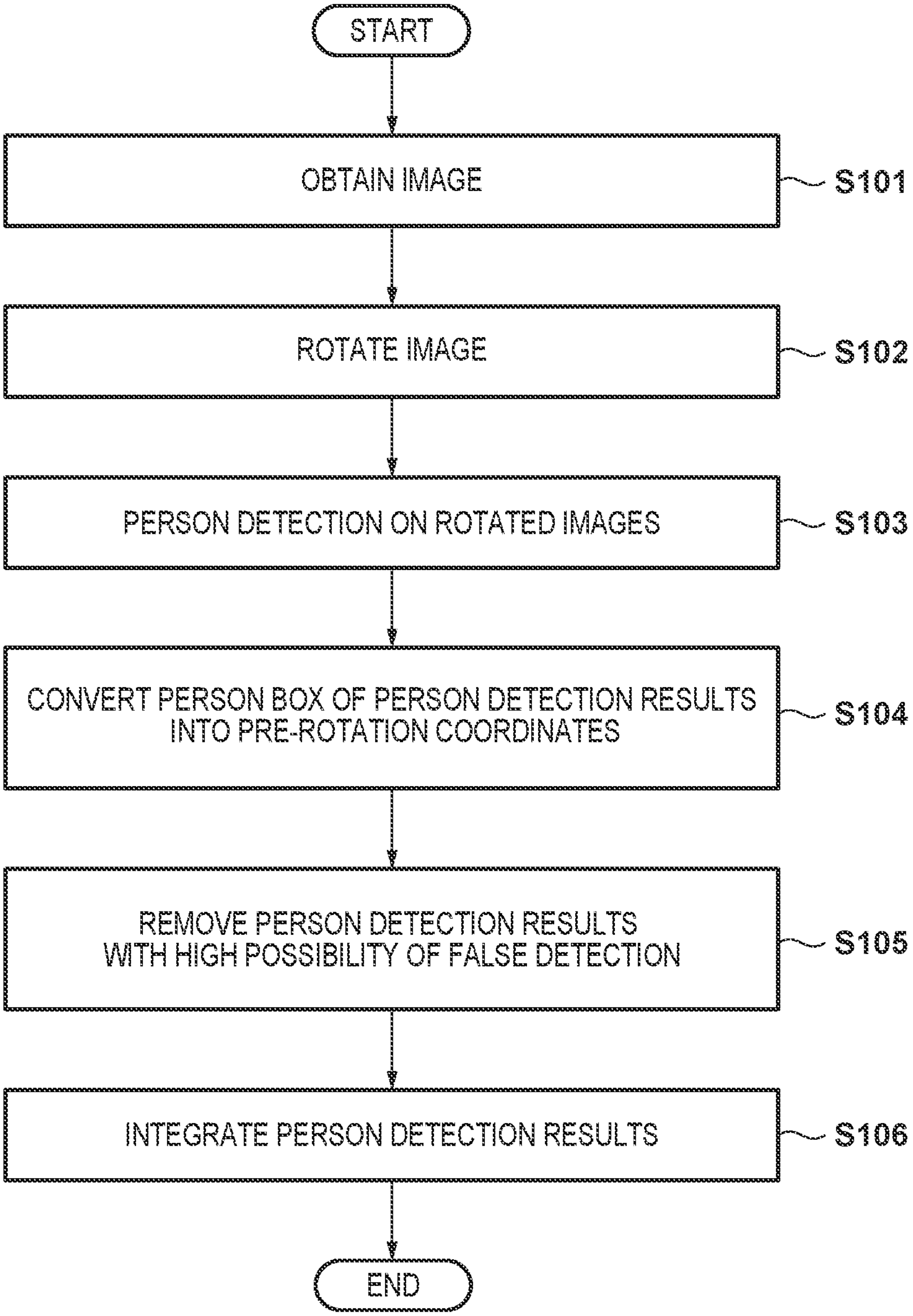
FIG. 3 is a flowchart illustrating the operations of the image processing apparatus according to the first embodiment.
Figure 4:
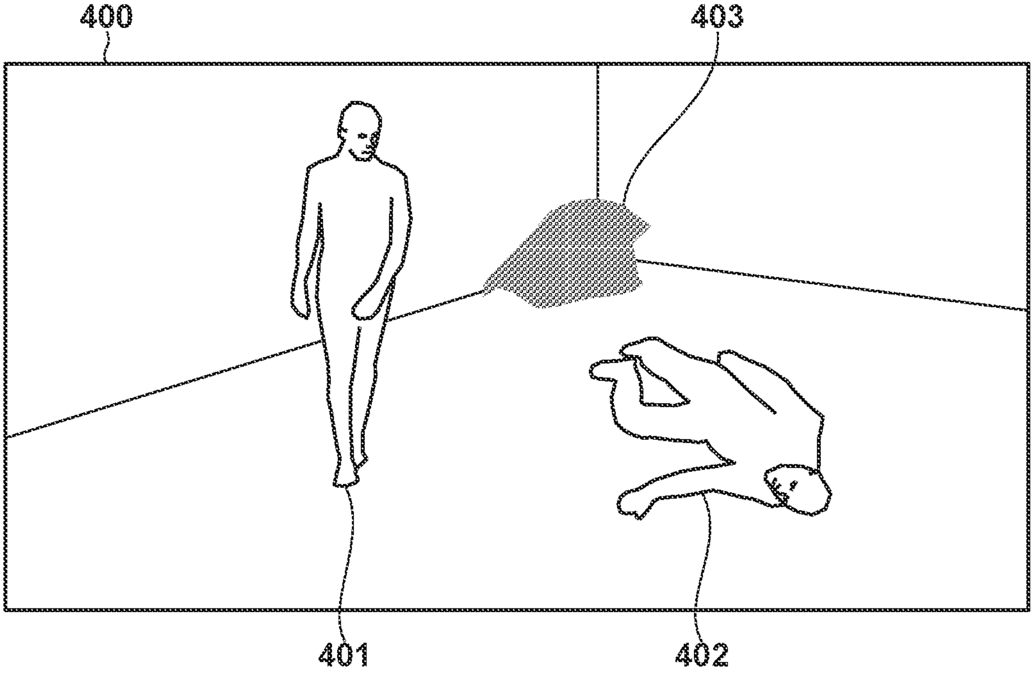
FIG. 4 is a schematic view illustrating an image according to the first embodiment.
Figure 5A:
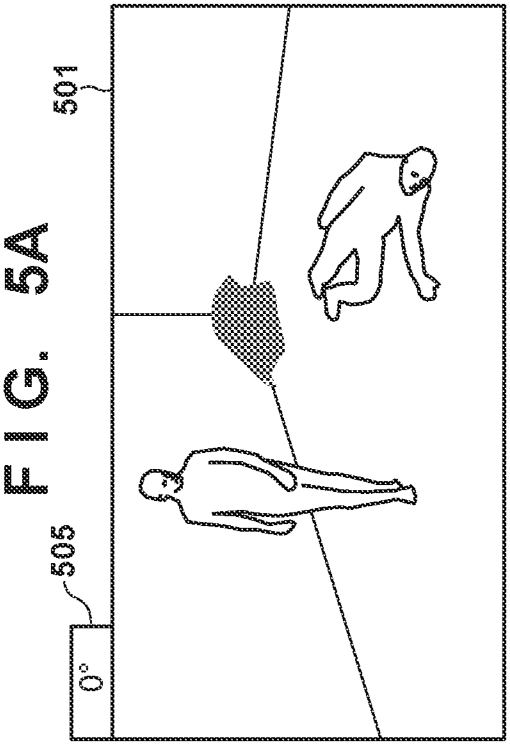
FIG. 5A is a schematic view illustrating a rotated image according to the first embodiment.
Figure 5B:
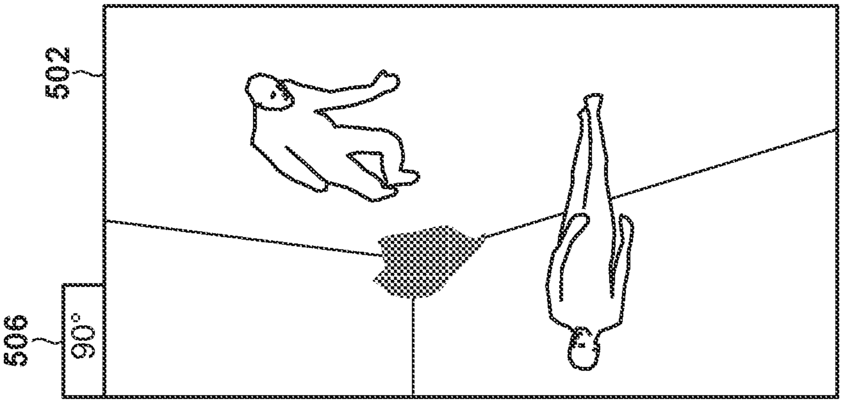
FIG. 5B is a schematic view illustrating a rotated image rotated 90 degrees according to the first embodiment.
Figure 5C:
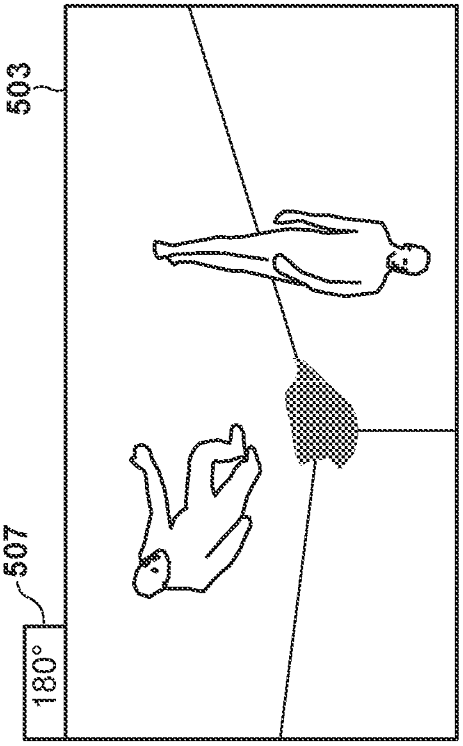
FIG. 5C is a schematic view illustrating a rotated image rotated 180 degrees according to the first embodiment.
Figure 5D:
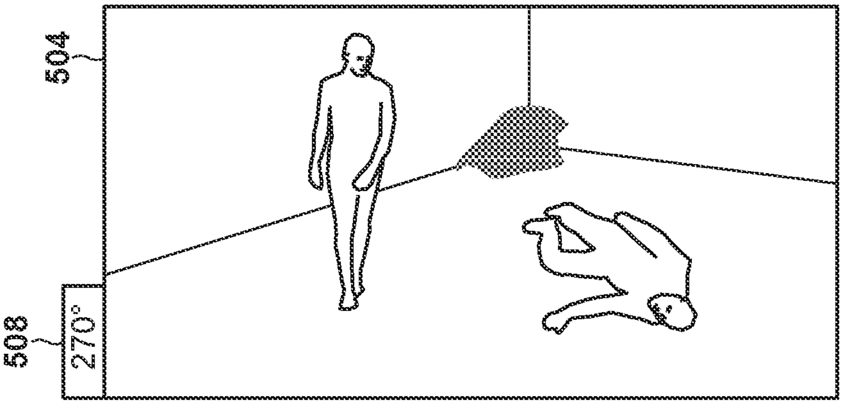
FIG. 5D is a schematic view illustrating a rotated image rotated 270 degrees according to the first embodiment.
Figure 8A:
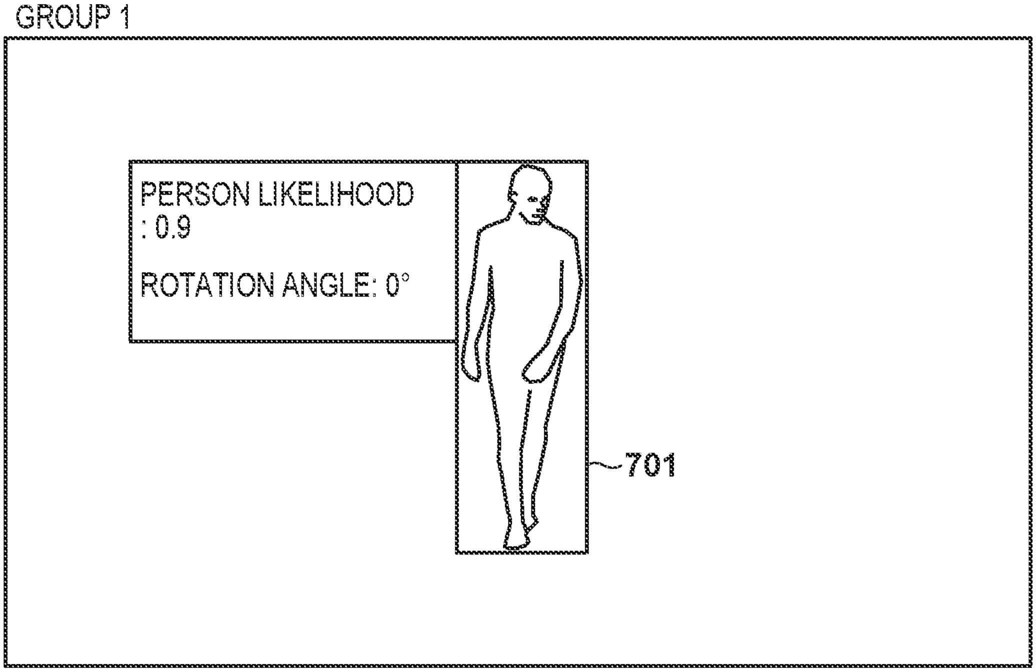
FIG. 8A is a schematic view illustrating grouping of a person detection result according to the first embodiment.
Figure 8B:
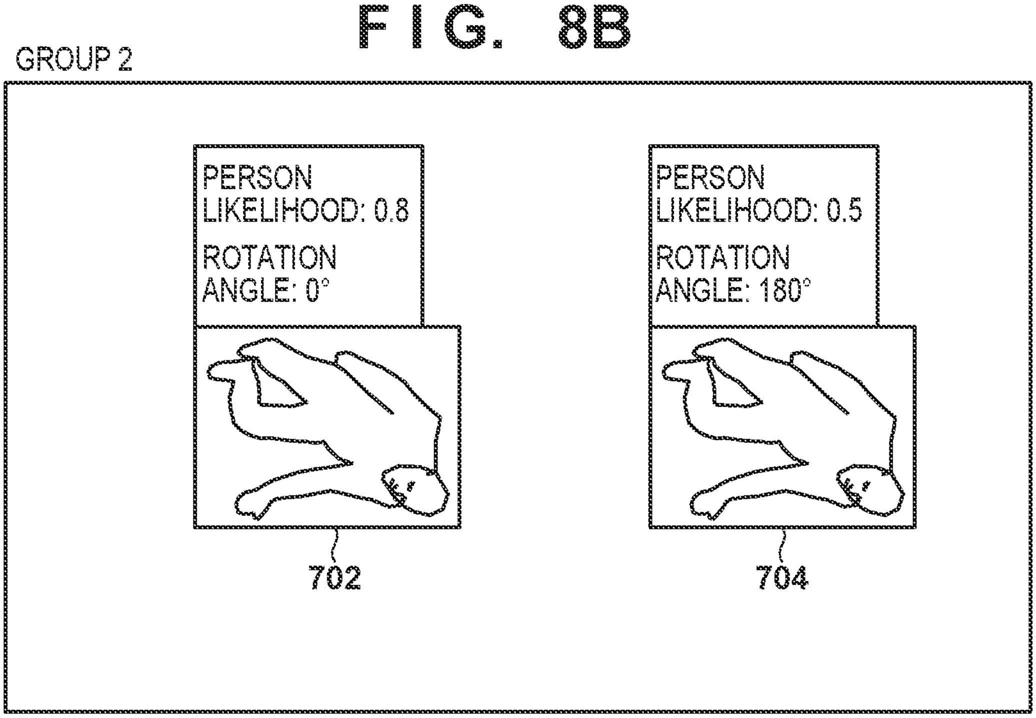
FIG. 8B is a schematic view illustrating grouping of a person detection result according to the first embodiment.

FIG. 3 is a flowchart illustrating the flow of the processing of the image processing apparatus 100 according to the present embodiment. FIG. 4 is a schematic view illustrating an image according to the present embodiment. FIGS. 5A to 5D are schematic views illustrating a rotated image according to the present embodiment. FIGS. 6A to 6D are schematic views illustrating a person detection result according to the present embodiment. FIGS. 7A to 7D are schematic views illustrating a pre-rotation person box according to the present embodiment. FIGS. 8A and 8B are schematic views illustrating grouping of person detection results according to the present embodiment.

The process of detecting a person box of a person in an image according to this embodiment will be described below with reference to FIGS. 1 to 8.

First, the overall processing operation will be described with reference to the flowchart of FIG. 3.

In step S101, the image obtaining unit 201 obtains an image obtained via image capture by the image capture apparatus 105. FIG. 4 is an example of an image 400 captured in this manner. In the image 400, two people, a person 401 and a person 402, are shown, and a non-person 403 is also shown. Any number of people may be included in an image including zero people or three or more people. The example of FIG. 4 should be understood to be merely an example in which there are two people.

In step S102, the rotation unit 202 rotates the image 400 obtained by the image obtaining unit 201 to generate rotated images 501 to 504 illustrated in FIGS. 5A to 5D. The rotated image 501 is an image obtained by rotating the image 400 0 degrees, the rotated image 502 is an image obtained by rotating the image 400 90 degrees, the rotated image 503 is an image obtained by rotating the image 400 180 degrees, and the rotated image 504 is an image obtained by rotating the image 400 270 degrees. Note that hereinafter, the anti-clockwise direction in the rotation direction is defined as the positive direction. Also, the rotation angle is expressed within a range from 0 degrees to 360 degrees. For example, a rotation angle of 270 degrees+180 degrees is equivalent to a rotation angle of 90 degrees. Also, any number of rotated images and any rotation angle may be used, and the present embodiment is not limited to those used in the example. Also, the rotation unit 202 provides information 505 to 508 indicating the rotation angle to the rotated images 501 to 504.

In step S103, the person detection unit 203 executes person detection processing in accordance with a person detection method using the DNN described in Document "Wang" on the rotated images 501 to 504 obtained by the rotation unit 202 to generate person detection results 601 to 607 (detection information indicating a person candidate region) illustrated in FIGS. 6A to 6D. This is merely an example, and any method able to perform person detection can be used, and the present embodiment is not limited to these examples. The person detection results 601 to 607 include a bounding box (hereinafter, referred to as a person box) for each person, a person likelihood, and the rotation angle of the rotated image which is the detection target. The person likelihood is a real number value from 0 to 1 and a value that indicates a higher possibility of a person existing in the person box when the value is closer to 1. Note that in the embodiment, a person candidate is determined when the person likelihood is equal to or greater than a preset threshold (for example, 0.2). The threshold is changed and set by the user operating the input apparatus 106.

To increase the speed of the person detection processing, before performing person detection using a DNN, the rotated image may be converted in a predetermined size (for example, the size of the image 400) via scaling up/down and padding. Conversion to a predetermined size can reduce the amount of processing for changing the shape of the entire DNN model which is required each time the input shape of the DNN model changes. Also, person detection may be performed after converting the images to a mini-batch with a size of B×H×W×C by connecting a plurality of rotated images converted to a predetermined size along a new axis. Here, B is the number of rotated images simultaneously subjected to person detection, H is a predetermined size (height), W is a predetermined size (width), and C is a predetermined size (channel number). Also, person detection may be performed after mapping the plurality of rotated images simultaneously subjected to person detection onto a single mapping image. Here, a mapping image has a size that allows the plurality of rotated images to be mapped without overlap. This is because the greater the number of elements in the images input into the DNN, the more effective the parallel processing performance of the processor can be.

Figures 6A, 6B, 6C, 6D:
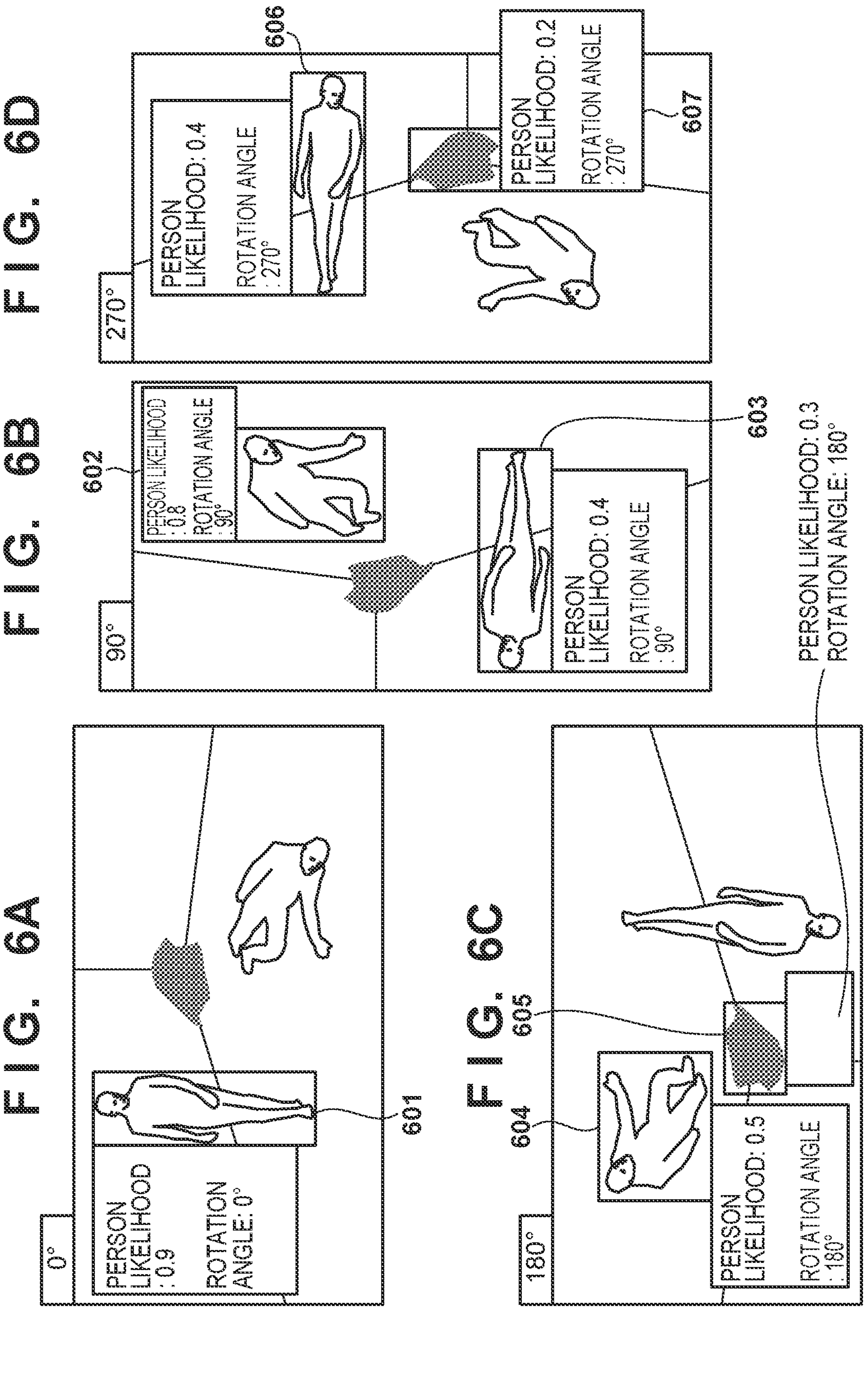
FIG. 6A is a schematic view illustrating a person detection result according to the first embodiment.
FIG. 6B is a schematic view illustrating a person detection result for a rotated image rotated 90 degrees according to the first embodiment.
FIG. 6C is a schematic view illustrating a person detection result for a rotated image rotated 180 degrees according to the first embodiment.
FIG. 6D is a schematic view illustrating a person detection result for a rotated image rotated 270 degrees according to the first embodiment.
Figures 7A, 7B, 7C, 7D:
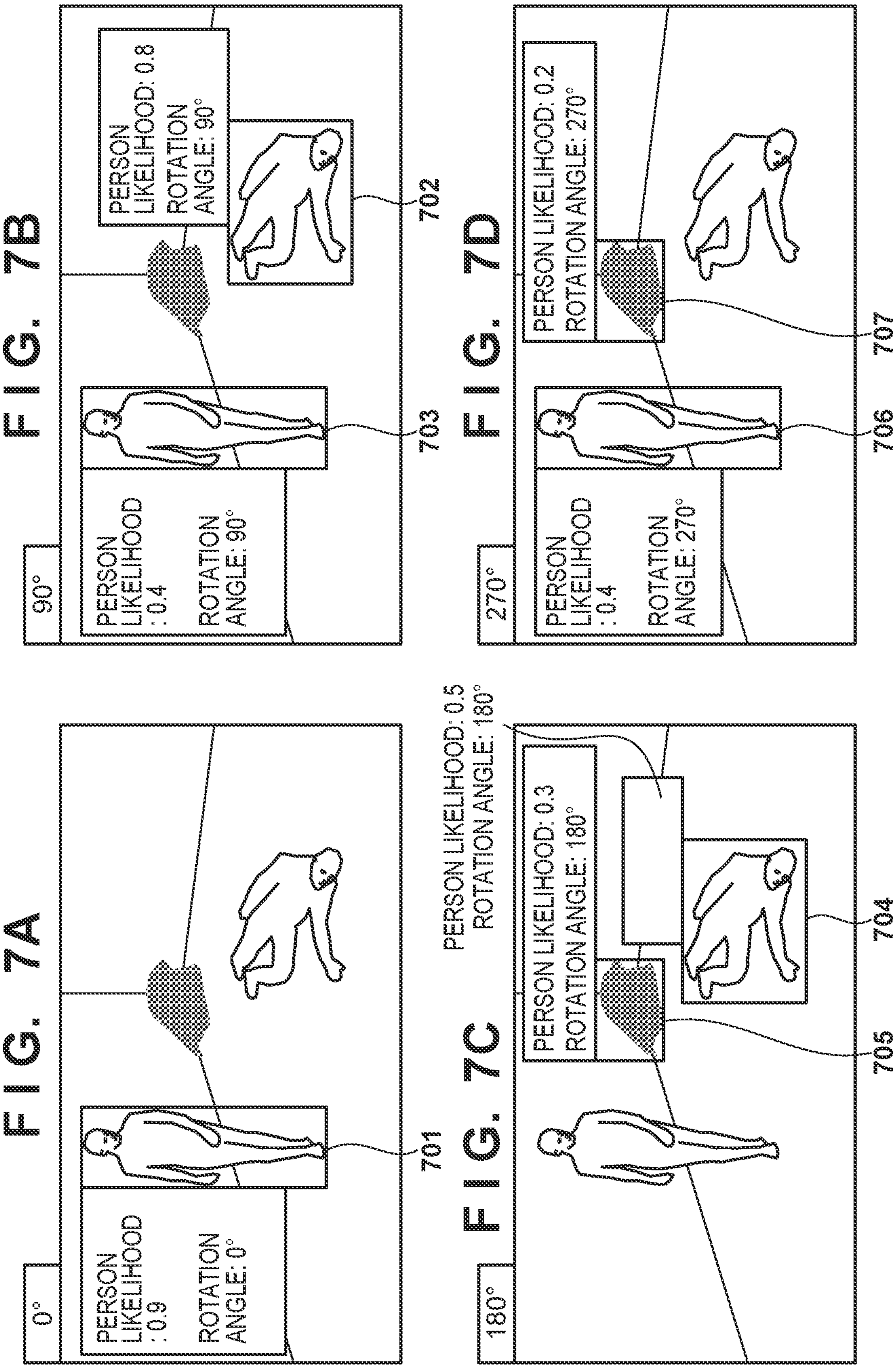
FIG. 7A is a schematic view illustrating a pre-rotation person box according to the first embodiment.
FIG. 7B is a schematic view illustrating a pre-rotation person box of a rotated image rotated 90 degrees according to the first embodiment.
FIG. 7C is a schematic view illustrating a pre-rotation person box of a rotated image rotated 180 degrees according to the first embodiment.
FIG. 7D is a schematic view illustrating a pre-rotation person box of a rotated image rotated 270 degrees according to the first embodiment.

Note that as illustrated in FIG. 6A, the person 401 has been detected as a person candidate, but the person 402 has not been detected as a person candidate. In FIG. 6B, both of the persons 401 and 402 have been detected as person candidates. Also, as illustrated in FIG. 6C, the person 402 and the non-person 403 have been detected as a person candidate, and the person 401 has not been detected as a person candidate. As illustrated in FIG. 6D, the person 401 and the non-person 403 have been detected as a person candidate, but the person 402 has not been detected as a person candidate.

In step S104, the reverse rotation unit 204 converts (coordinates representing) the person box of the person detection results 601 to 607 obtained by the person detection unit 203 into coordinates in the image 400 on the basis of each rotation angle to generate pre-rotation person boxes 701 to 707 illustrated in FIG. 7.

In step S105, from among the pre-rotation person boxes 702 to 707 with a rotation angle other than 0 degrees, the removal unit 205 removes the pre-rotation person boxes 703, 705, 706, and 707 that are outside of the highest ranking k=2 for person likelihood. The example here is merely an example, and k can be any natural number of 1 or greater such as 1 or 3 and may be set by the user. Also, k may be set on the basis of a number n of person detection results as in the following Formula (1).

$$k=\text{Ceiling}(n\times r) \qquad (1)$$

Here, Ceiling (x) is a ceiling function that returns the smallest integer that is not less than a real number x. Also, r is a parameter for adjusting what percentage of the person detection results to remove with respect to the number of person detection results and may be any value such as 0.1 or 0.2 and may be selected by the user from a preset range.

Instead of removing the pre-rotation person boxes outside of the highest ranking k, pre-rotation person box outside of the highest ranking k may be removed for each rotation angle from the entire pre-rotation person boxes 702 to 707 with a rotation angle other than 0 degrees. Instead of those outside of the highest ranking k, pre-rotation person boxes with a value less than a predetermined threshold may be removed. In this example, a rotation angle other than 0 degrees is used, but a pre-rotation person box with a different rotation angle may be removed. Also, person detection may be applied to evaluation data, positive detection numbers for each rotation angle may be calculated, and from the positive detection numbers, which rotation angle pre-rotation person boxes to remove may be decided. Any method can be used that can remove pre-rotation person boxes with a high false detection possibility from among the pre-rotation person boxes obtained from rotated images with a rotation angle with a few number of person boxes that can be detected. However, the present embodiment is not limited to these methods.

In step S106, the integration unit 206 calculates the intersection over union (IoU) representing an evaluation index between pre-rotation person boxes after the removal processing of step S105. IoU is a value indicating the degree of match between boxes. As illustrated in FIGS. 8A and 8B, the person detection results corresponding to the pre-rotation person boxes with an IoU equal to or greater than a predetermined threshold are grouped in groups of person detection results for the same person. This example is merely an example, and the person detection results corresponding to pre-rotation person boxes with a distance between center coordinates equal to or less than a predetermined threshold may be grouped as person detection results for the same person. Any method can be used that can group person detection results for the same person. The present embodiment is not limited these methods. Lastly, the result with the highest person likelihood is selected from the grouped person detection results. This example is merely an example, and the result with the largest person box size may be selected, or, in the case of images with plurality frames, the result with smallest amount of positional movement in the person box between frames may be selected. Any method able to generate a highly accurate person detection result can be used, and the present embodiment is not limited to these examples.

As described above, in the first embodiment, person detection is performed on rotated images of a plurality of rotation angles and the person box with the lowest degree of certainty is removed from among the person boxes obtained from the rotated image of a predetermined rotation angle. According to the first embodiment, by removing the person box with a lowest degree of certainty from among the person boxes obtained from rotated images of a rotation angle with a few number of person boxes that can be detected, an increase in false detection can be suppressed and the detection accuracy of person detection for person postures that are difficult for person detection can be increased.

Second Embodiment

In the processing of the second embodiment described herein, person detection is performed on rotated images of a plurality of rotation angles and person boxes with a high false detection possibility are removed using person likelihood distribution.

Figure 9:
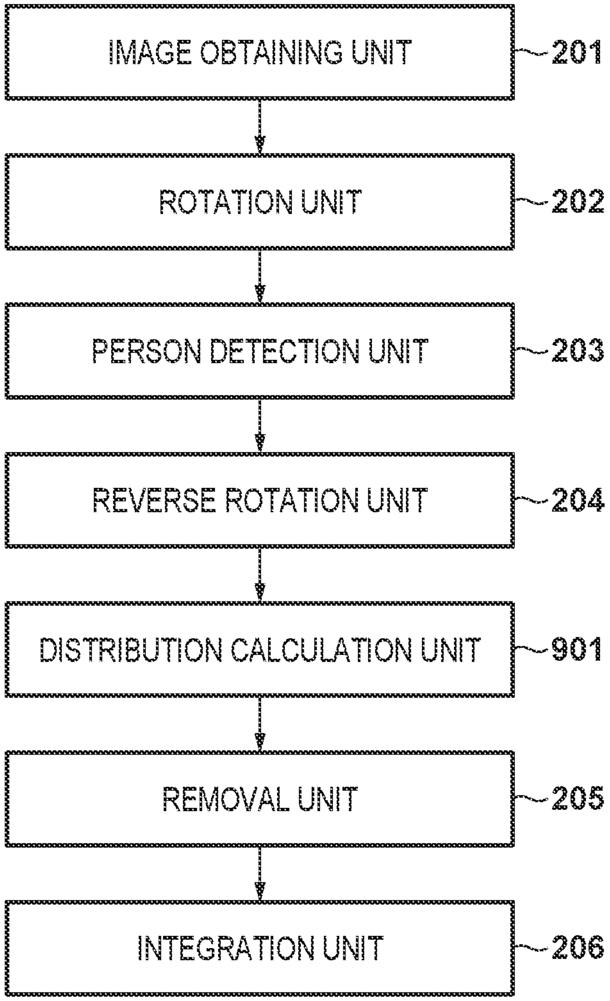
FIG. 9 is a block diagram illustrating an example of the functional configuration of the image processing apparatus according to a second embodiment.

The hardware configuration diagram of the image processing apparatus is the same as in FIG. 1 of the first embodiment and thus will not be described. FIG. 9 is a block diagram illustrating the basic functional configuration of an image processing apparatus according to the present second embodiment. FIG. 9 is also a functional configuration diagram of software for image processing according to the second embodiment being executed by the CPU 101. In this state, the image processing apparatus 100 includes the image obtaining unit 201, the rotation unit 202, the person detection unit 203, the reverse rotation unit 204, a distribution calculation unit 901, the removal unit 205, and the integration unit 206. Note that a part of the illustrated configuration may be implemented by a circuit or the like other than the CPU 101.

Figure 10:
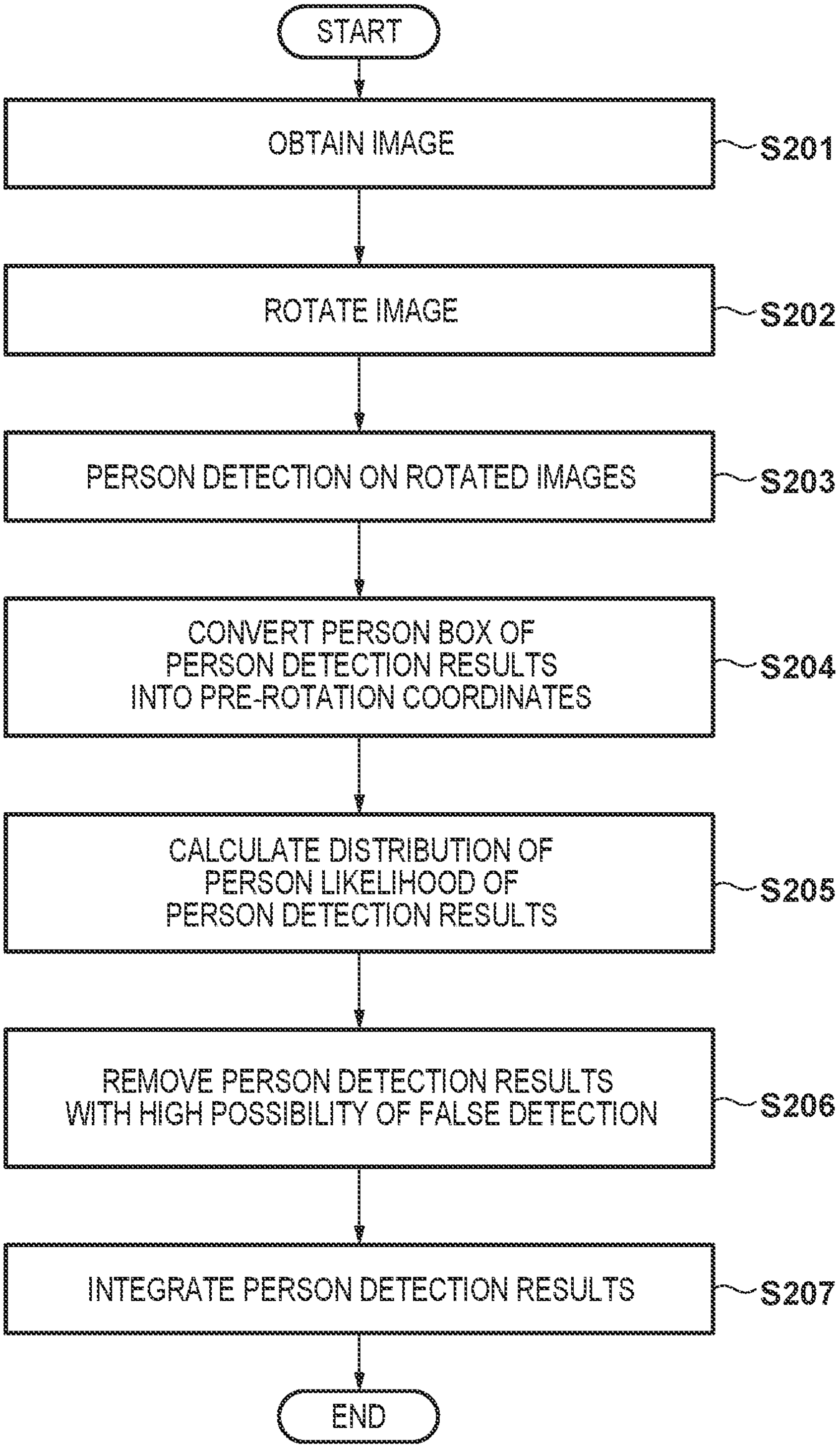
FIG. 10 is a flowchart illustrating the operations of the image processing apparatus according to the second embodiment.
Figure 12A:
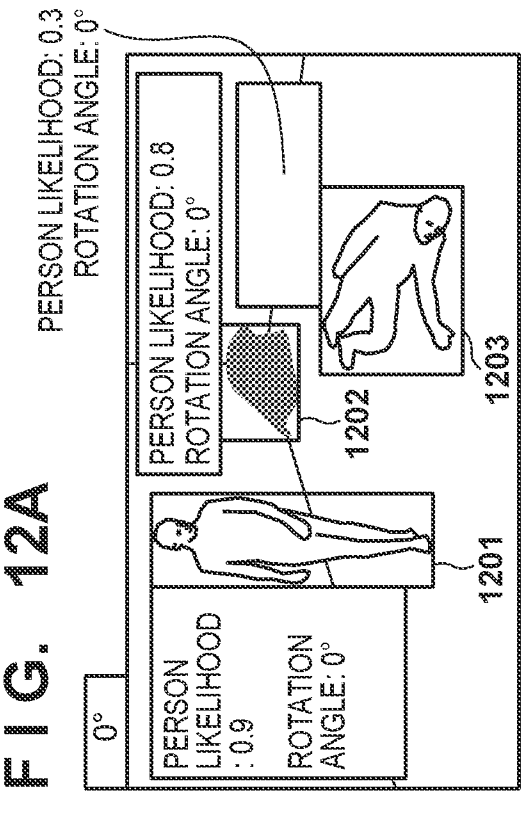
FIG. 12A is a schematic view illustrating a pre-rotation person box according to the second embodiment.
Figure 12B:
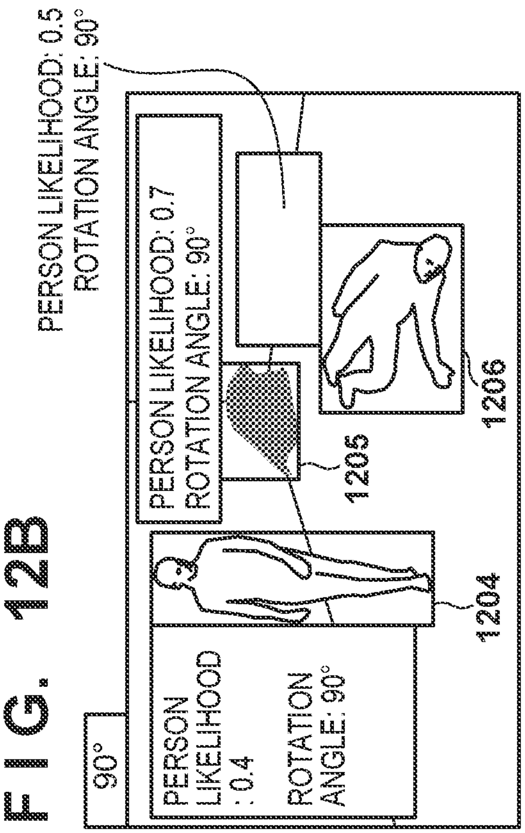
FIG. 12B is a schematic view illustrating a pre-rotation person box of a rotated image rotated 90 degrees according to the second embodiment.
Figure 12C:
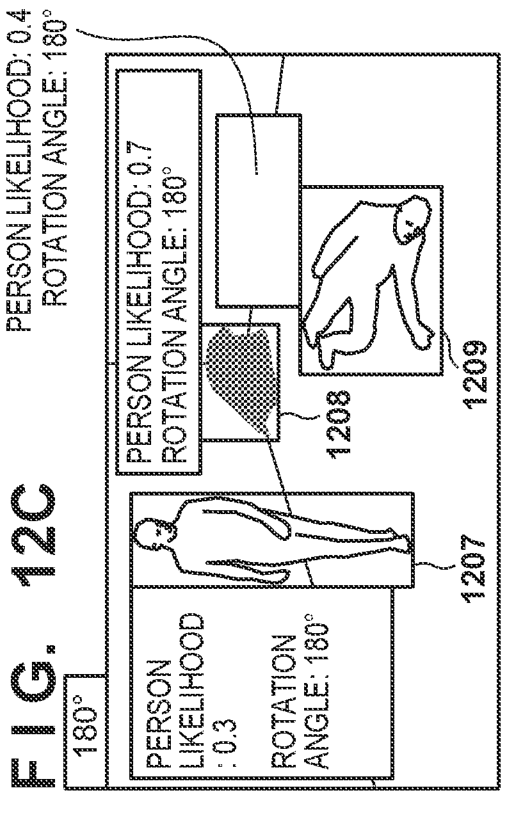
FIG. 12C is a schematic view illustrating a pre-rotation person box of a rotated image rotated 180 degrees according to the second embodiment.
Figure 12D:
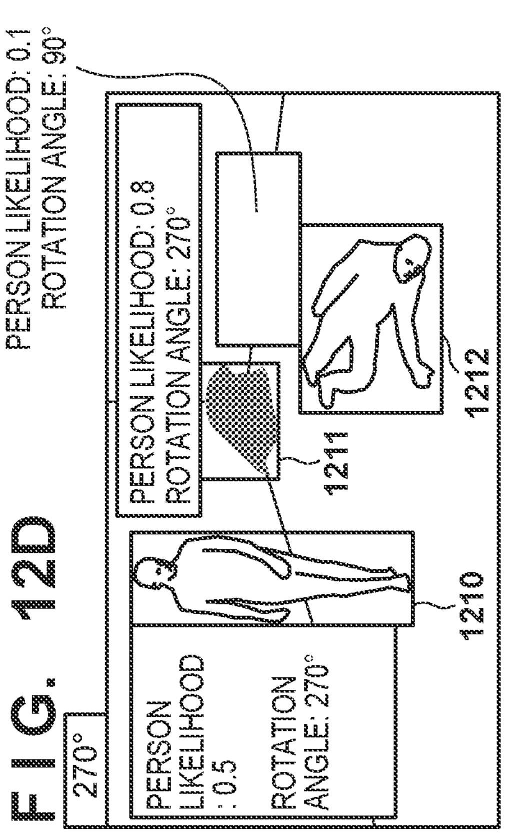
FIG. 12D is a schematic view illustrating a pre-rotation person box of a rotated image rotated 270 degrees according to the second embodiment.

FIG. 10 is a flowchart illustrating the flow of processing according to the present second embodiment. FIGS. 11A to 11D are schematic views illustrating a person detection result according to the present second embodiment. FIGS.

12A to 12D are schematic views illustrating a pre-rotation person box according to the present second embodiment. FIGS. 13A to 13D are schematic views of person likelihood distribution according to the present second embodiment. Also, in the present second embodiment, FIGS. 4 and 5A to 5D will be referenced.

The process of detecting a person box of a person in an image according to the second embodiment will be described below with reference to FIGS. 4, 5A to 5D, 9, 10, and 11A to 11D to 13A to 13C.

First, in step S201, the image obtaining unit 201 obtains a captured image (reference sign 400 in FIG. 4). The detailed processing is the same as that in the first embodiment, and thus the description thereof will be omitted.

In step S202, the rotation unit 202 executes processing to rotate the image 400 obtained by the image obtaining unit 201 to generate the rotated images 501 to 504 illustrated in FIGS. 5A to 5D. The detailed processing is the same as that in the first embodiment, and thus the description thereof will be omitted.

In step S203, the person detection unit 203 executes person detection processing in accordance with a person detection method using the DNN described in Document "Wang" on the rotated images 501 to 504 obtained by the rotation unit 202 to generate person detection results 1101 to 1112 illustrated in FIGS. 11A to 11D. The detailed processing is the same as that in the first embodiment, and thus the description thereof will be omitted.

In step S204, the reverse rotation unit 204 converts the person box of the person detection results 1101 to 1112 obtained by the person detection unit 203 into coordinates in the image 400 on the basis of each rotation angle to generate pre-rotation person boxes 1201 to 1212 illustrated in FIGS. 12A to 12D.

Figure 13A:
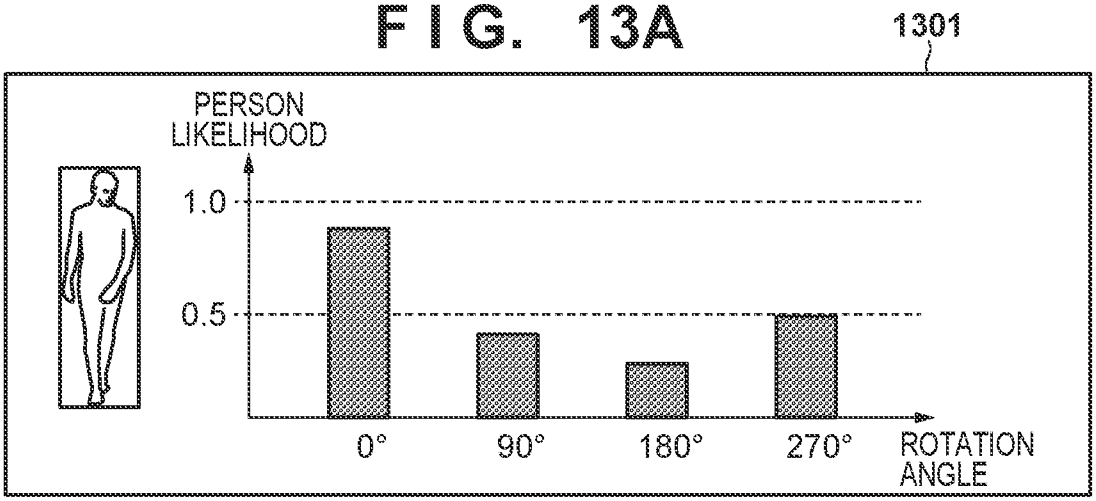
FIG. 13A is a schematic view illustrating person likelihood distribution according to the second embodiment.
Figure 13B:
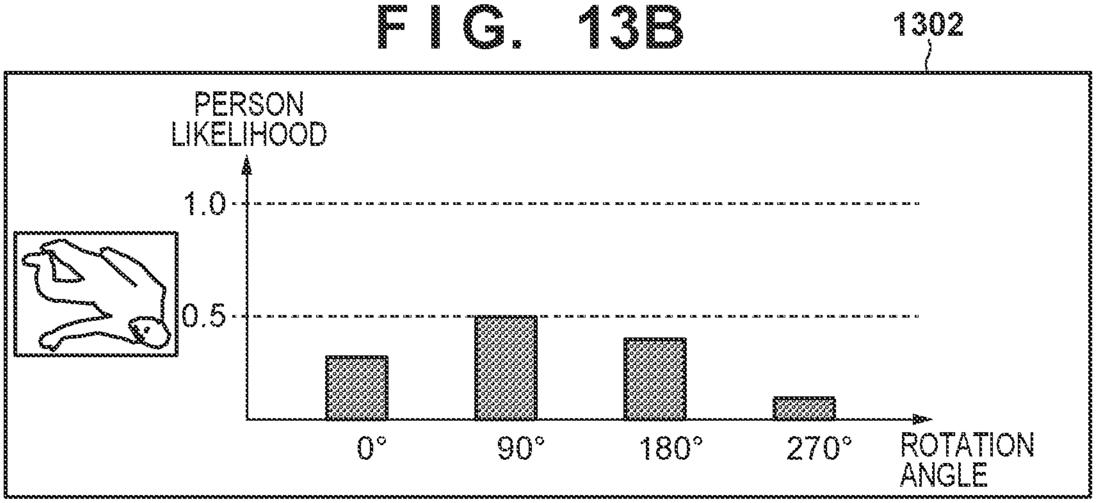
FIG. 13B is a schematic view illustrating person likelihood distribution according to the second embodiment.
Figure 13C:
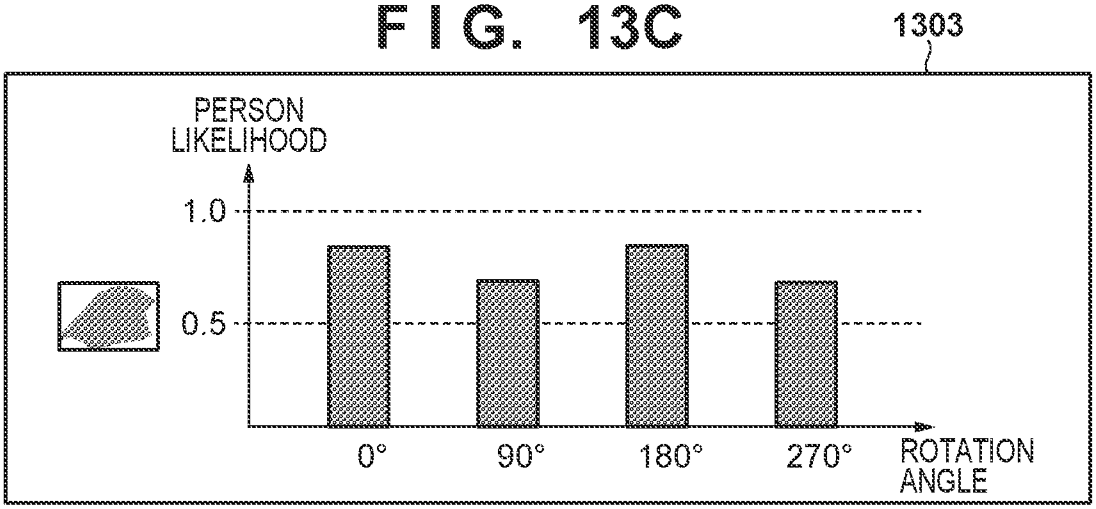
FIG. 13C is a schematic view illustrating person likelihood distribution according to the second embodiment.

In step S205, the distribution calculation unit 901 calculates the IoU representing an evaluation index between pre-rotation person boxes, and the person detection results corresponding to the pre-rotation person boxes with an IoU equal to or greater than a predetermined threshold are grouped in groups of person detection results for the same person. This example is merely an example, and the person detection results corresponding to pre-rotation person boxes with a distance between center coordinates equal to or less than a predetermined threshold may be grouped as person detection results for the same person. Any method can be used that can group person detection results for the same person. The present embodiment is not limited these methods. Lastly, the distribution calculation unit 901 calculates the person likelihood distribution for each rotation angle from the grouped person detection results. As illustrated in FIGS. 13A to 13C, person likelihood distributions 1301 to 1303 indicating target person candidates are generated by categorizing per region of the same position in the original image.

In step S206, the removal unit 205 removes person detection results corresponding to a condition that the absolute value of a difference between the maximum person likelihood and the person likelihood of the region obtained from a rotated image of a rotation angle which is the rotation angle of the maximum person likelihood plus 180 degrees is less than a predetermined threshold for each of the person likelihood distributions 1301 to 1303 illustrated in FIGS. 13A to 13C.

Here, the threshold is 0.3, for example. In this case, since only the person likelihood distribution 1303 has an absolute value of a difference between the maximum person likelihood and the person likelihood obtained from a rotated image of a rotation angle which is the rotation angle of the maximum person likelihood plus 180 degrees of 0.1, which is less than the threshold, the corresponding person detection results 1102, 1105, 1108, 1111 are removed. This allows false detection objects to be removed by utilizing the tendency of person likelihood changing greatly depending on the rotation angle in the case of a person with both a head portion and a leg portion due to looking different in the up-and-down direction, namely having high direction dependence and the tendency of person likelihood changing little depending on the rotation angle in the case of a false detection object with low direction dependence. This example is merely an example, and the threshold can be any value such as 0.5 or 0.2 that is appropriate for the value range of person likelihood. Also, instead of using the absolute value of a difference between the maximum person likelihood and the person likelihood at a rotation angle which is the rotation angle of the maximum person likelihood plus 180 degrees, when the person likelihood dispersion is less than a predetermined threshold, the corresponding person detection result may be removed, or when the person likelihood at a plurality of rotation angles does not satisfy a predetermined threshold, the corresponding person detection result may be removed. Any method using person likelihood distribution can be used that can remove pre-rotation person boxes with a high false detection possibility. However, the present embodiment is not limited to these methods.

In step S207, the integration unit 206 calculates the evaluation index IoU between pre-rotation person boxes. The person detection results corresponding to the pre-rotation person boxes with an IoU equal to or greater than a predetermined threshold are grouped in groups of person detection results for the same person. The detailed processing for grouping is the same as that in the first embodiment, and thus the description thereof will be omitted. Lastly, the result with the highest person likelihood is selected from the grouped person detection results. The detailed processing for selecting the person detection result is the same as that in the first embodiment, and thus the description thereof will be omitted.

In the second embodiment described above, person detection is performed on rotated images of a plurality of rotation angles and person boxes with a high false detection possibility are removed using person likelihood distribution. According to the second embodiment, even when the person likelihood of a person box with a high possibility of false detection is higher than the person likelihood of a person box for a person, it can be removed.

Third Embodiment

In the processing of the third embodiment described herein, for a captured image obtained by a fisheye camera, person detection is performed on rotated images of a plurality of rotation angles and person boxes with a high false detection possibility are removed from person boxes obtained from rotated images of different rotation angles according to the position in the image of the person box.

Figure 14:
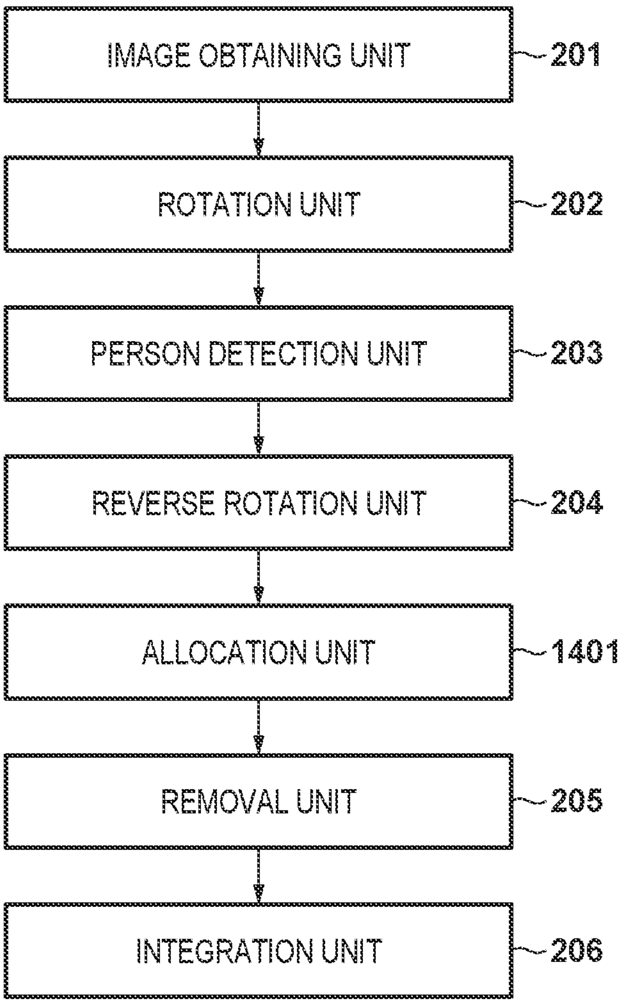
FIG. 14 is a block diagram illustrating an example of the functional configuration of the image processing apparatus according to a third embodiment.

The hardware configuration diagram of the image processing apparatus is the same as in FIG. 1 of the first embodiment and thus will not be described. FIG. 14 is a block diagram illustrating the basic functional configuration of an image processing apparatus according to the present third embodiment. FIG. 14 is also a functional configuration diagram of software for image processing according to the third embodiment being executed by the CPU 101. In this state, the image processing apparatus 100 includes the image obtaining unit 201, the rotation unit 202, the person detection unit 203, the reverse rotation unit 204, an allocation unit 1401, the removal unit 205, and the integration unit 206. Note that a part of the illustrated configuration may be implemented by a circuit or the like other than the CPU 101.

Figure 15:
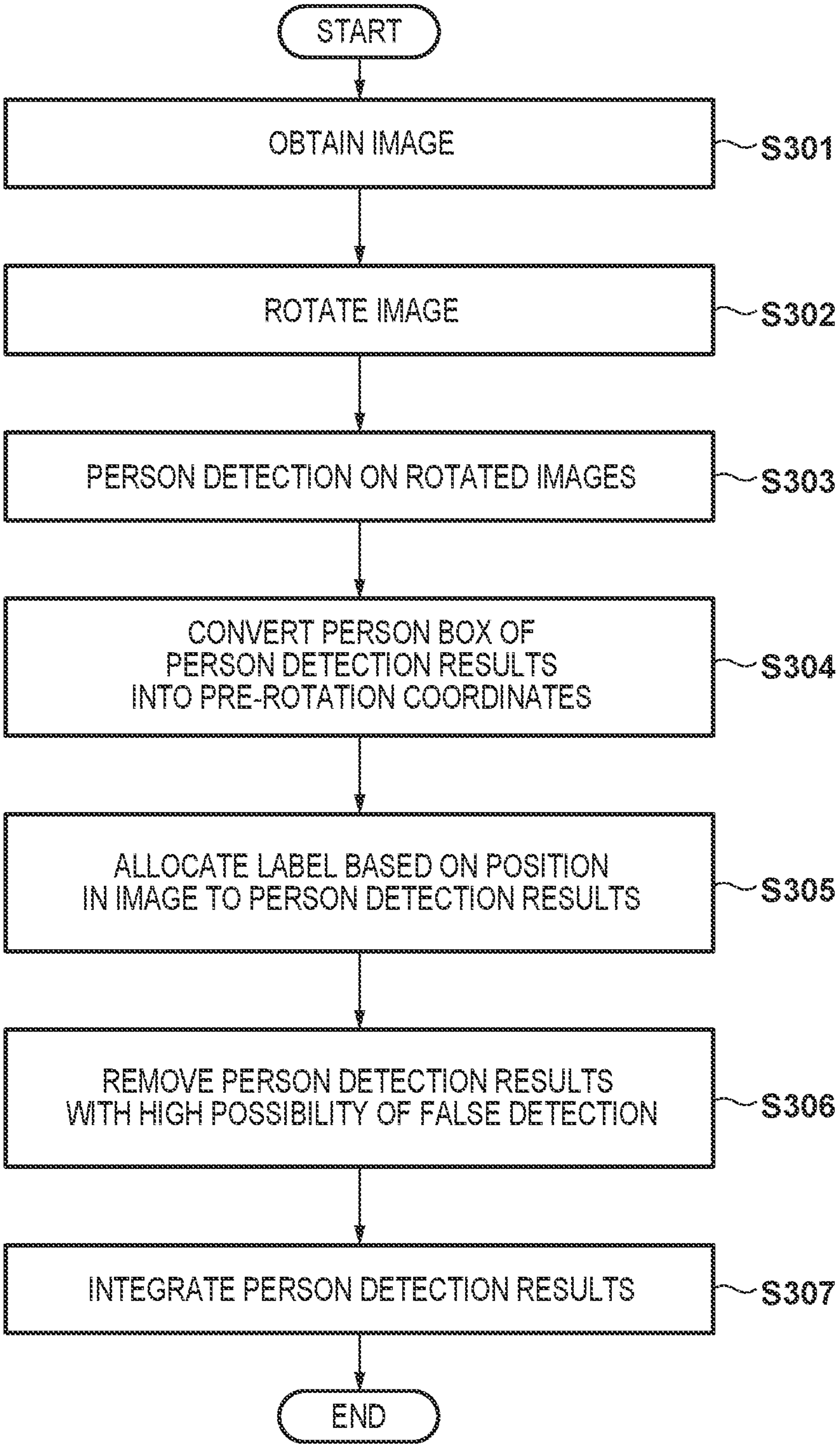
FIG. 15 is a flowchart illustrating the operations of the image processing apparatus according to the third embodiment.
Figure 16:
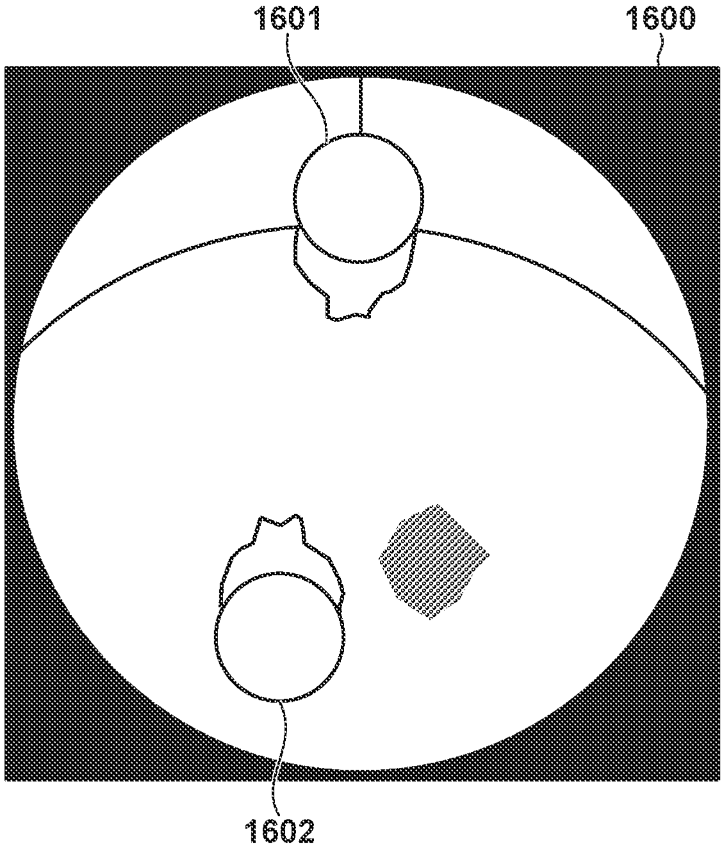
FIG. 16 is a schematic view illustrating an image according to the third embodiment.
Figure 17A:
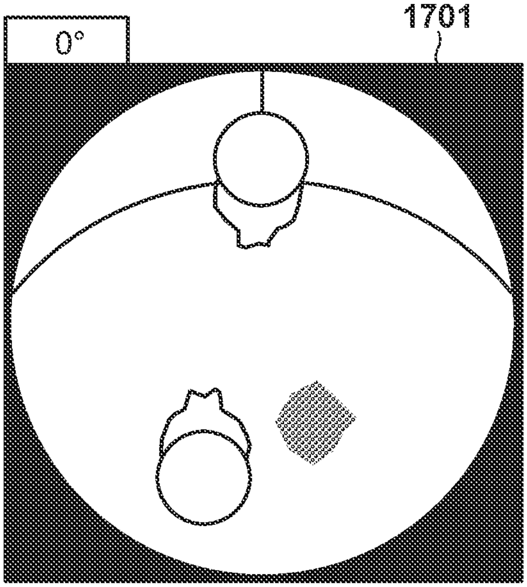
FIG. 17A is a schematic view illustrating a rotated image according to the third embodiment.
Figure 17B:
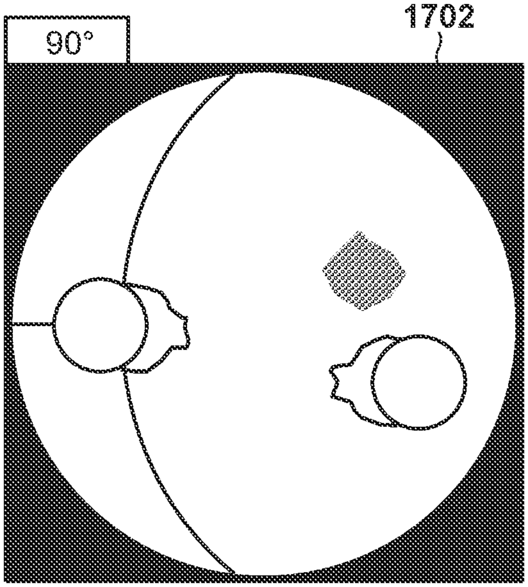
FIG. 17B is a schematic view illustrating a rotated image rotated 90 degrees according to the third embodiment.
Figure 17C:
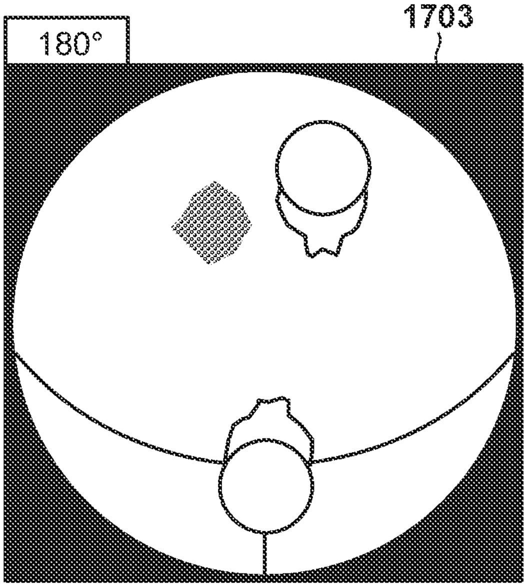
FIG. 17C is a schematic view illustrating a rotated image rotated 180 degrees according to the third embodiment.
Figure 17D:
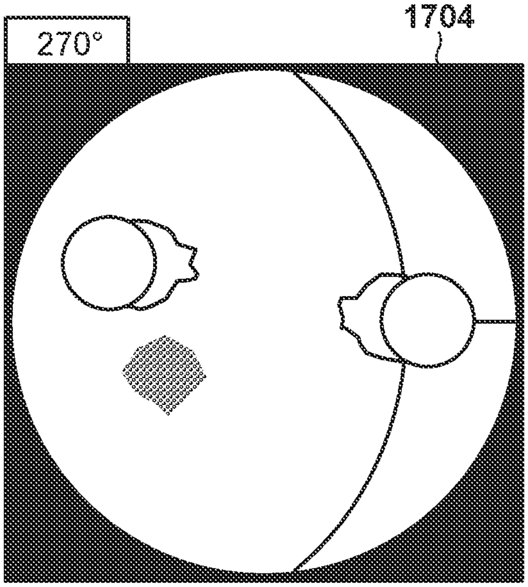
FIG. 17D is a schematic view illustrating a rotated image rotated 270 degrees according to the third embodiment.
Figure 18A:
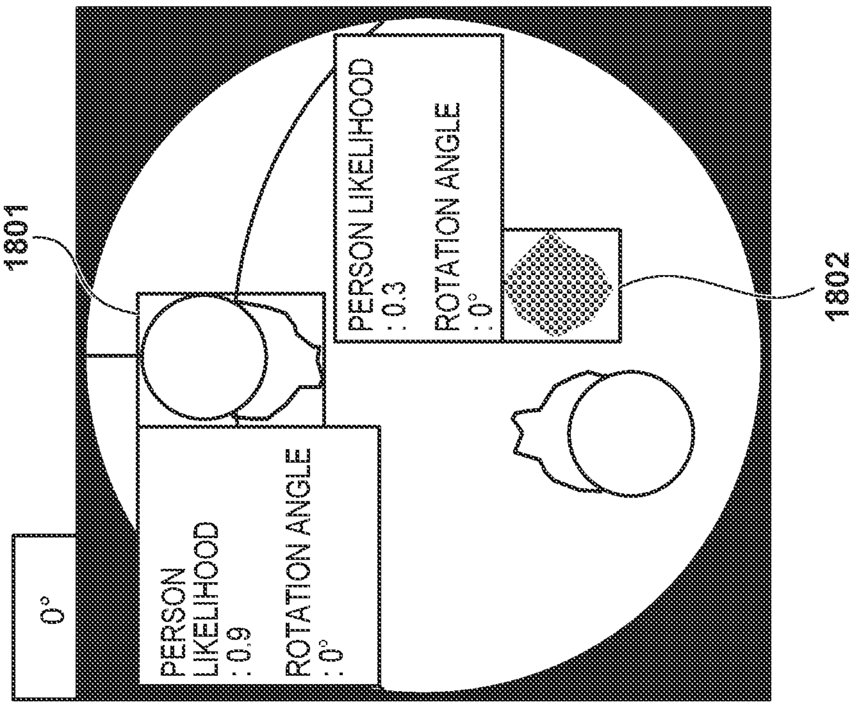
FIG. 18A is a schematic view illustrating a person detection result according to the third embodiment.
Figure 18B:
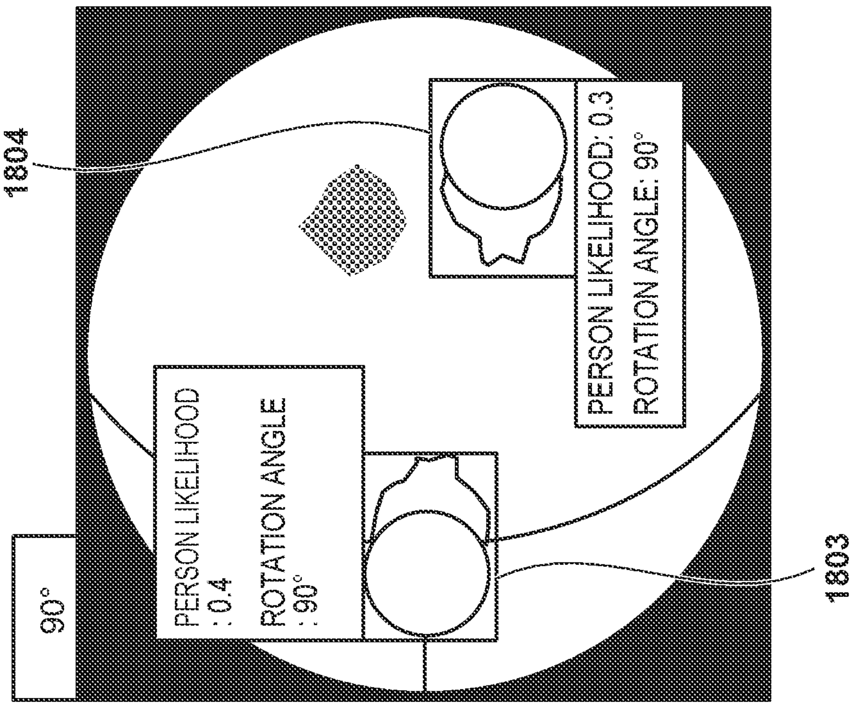
FIG. 18B is a schematic view illustrating a person detection result for a rotated image rotated 90 degrees according to the third embodiment.
Figure 18C:
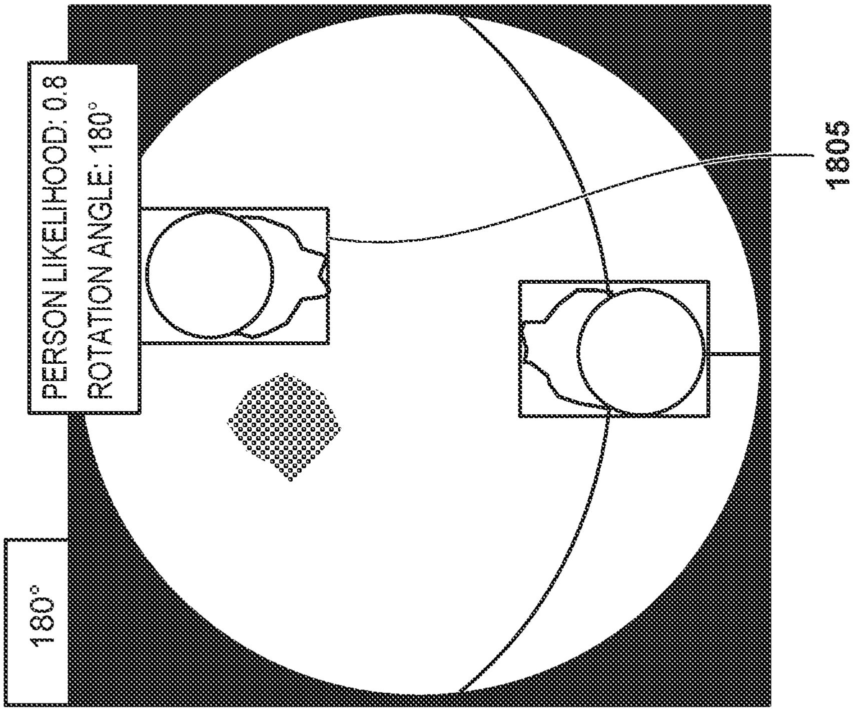
FIG. 18C is a schematic view illustrating a person detection result for a rotated image rotated 180 degrees according to the third embodiment.
Figure 18D:
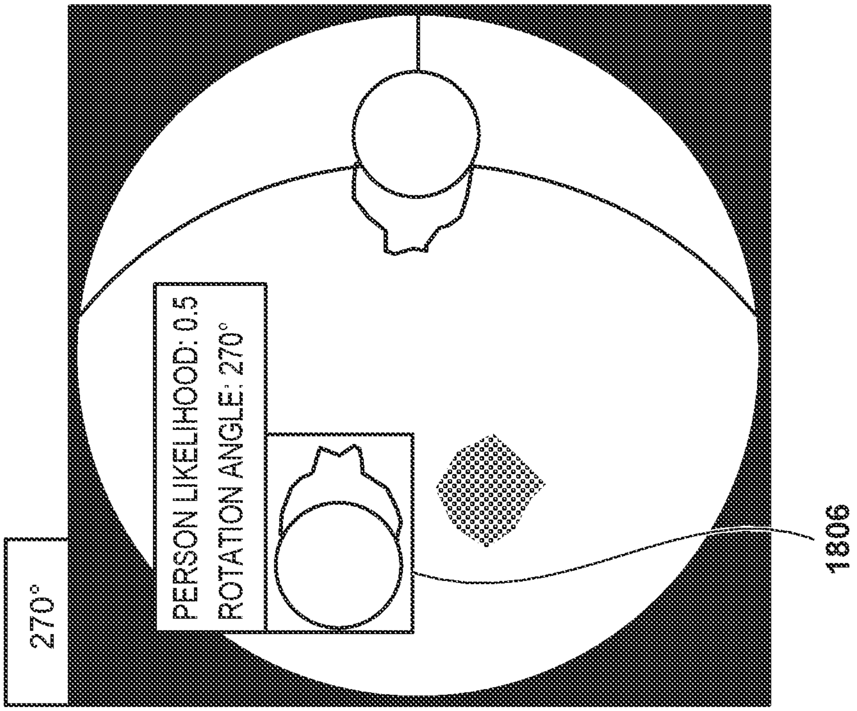
FIG. 18D is a schematic view illustrating a person detection result for a rotated image rotated 270 degrees according to the third embodiment.
Figure 19A:
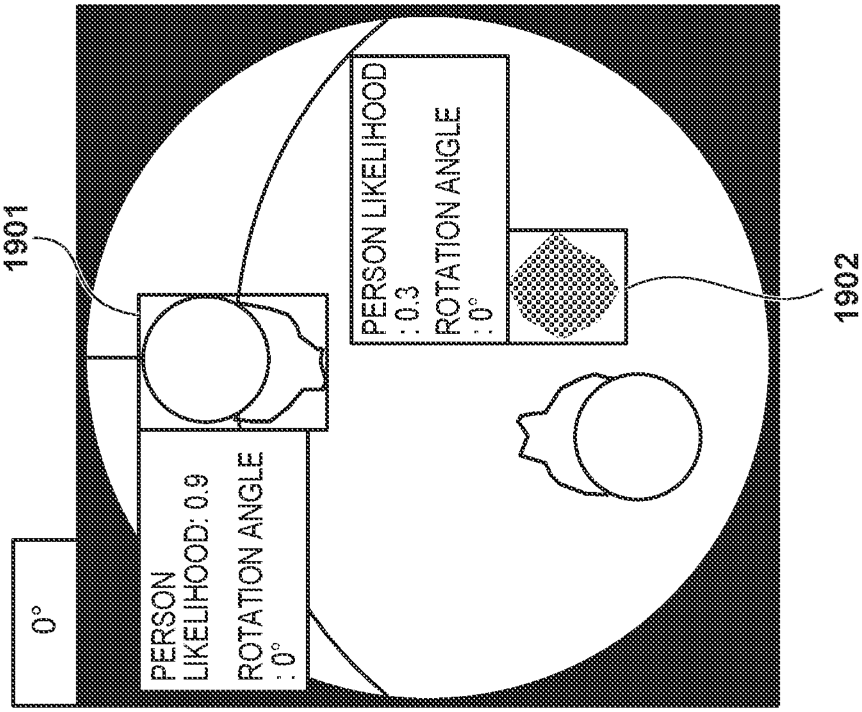
FIG. 19A is a schematic view illustrating a pre-rotation person box according to the third embodiment.
Figure 19B:
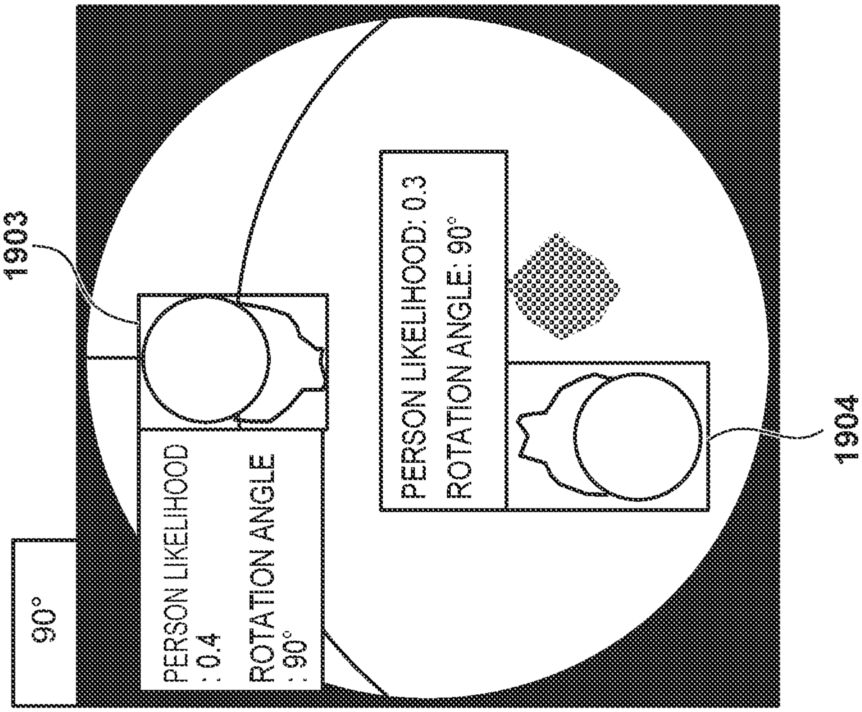
FIG. 19B is a schematic view illustrating a pre-rotation person box of a rotated image rotated 90 degrees according to the third embodiment.
Figure 19C:
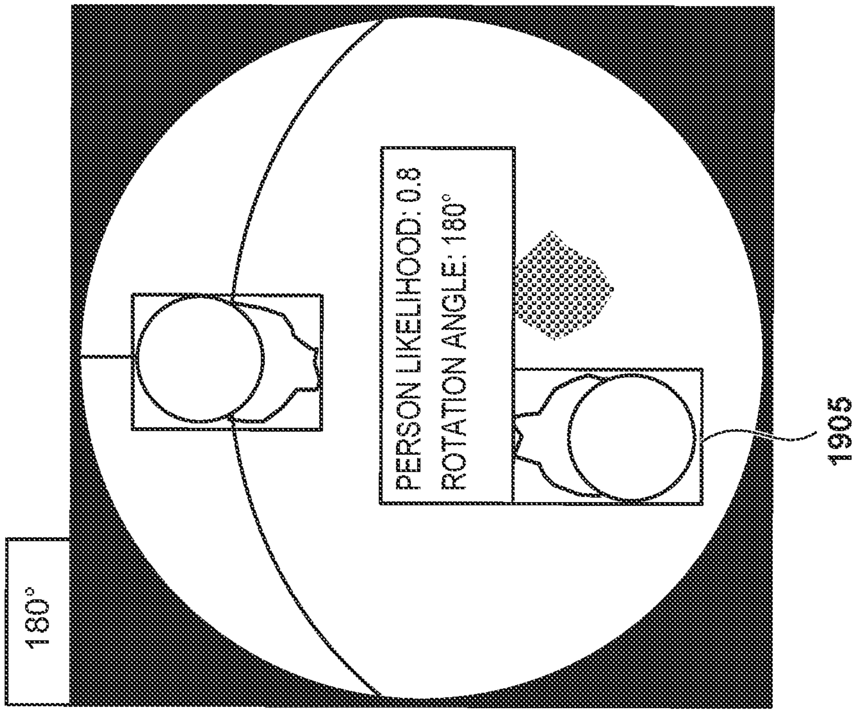
FIG. 19C is a schematic view illustrating a pre-rotation person box of a rotated image rotated 180 degrees according to the third embodiment.
Figure 19D:
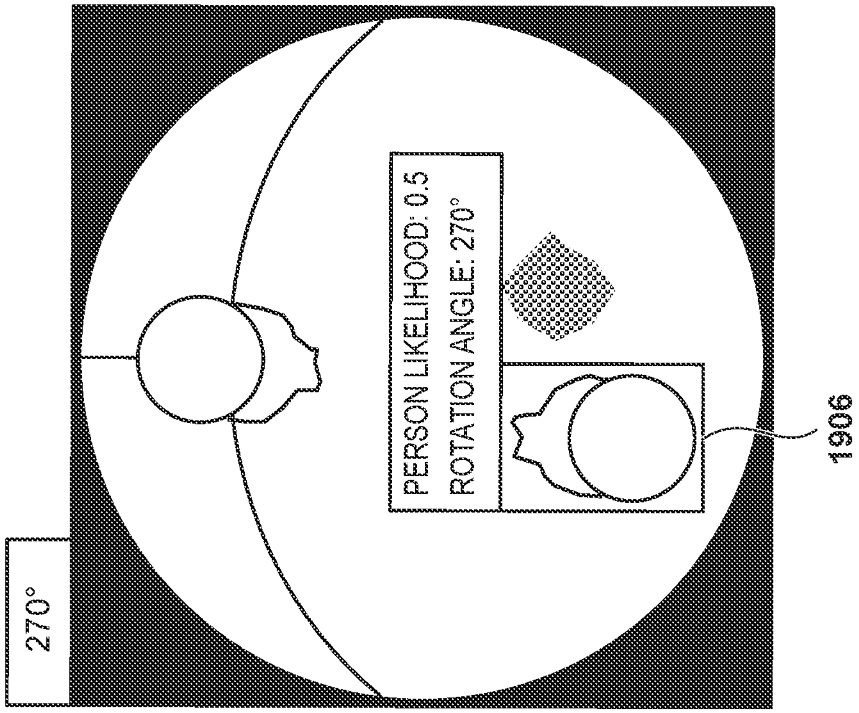
FIG. 19D is a schematic view illustrating a pre-rotation person box of a rotated image rotated 270 degrees according to the third embodiment.
Figures 20, 21:
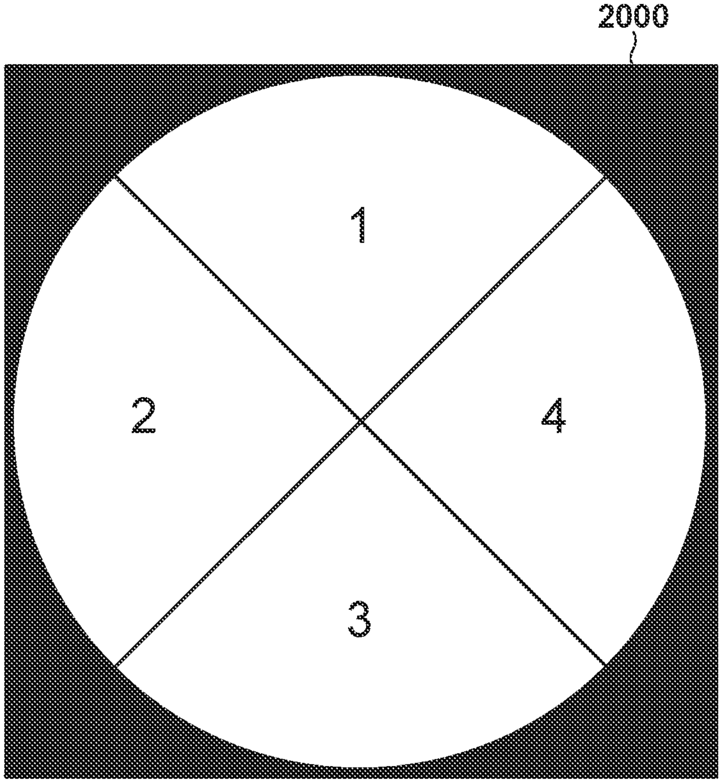
FIG. 20 is a schematic view illustrating an allocation map according to the third embodiment.
FIG. 21 is a schematic view illustrating a rotation angle for removal table according to the third embodiment.
Figure 22A:
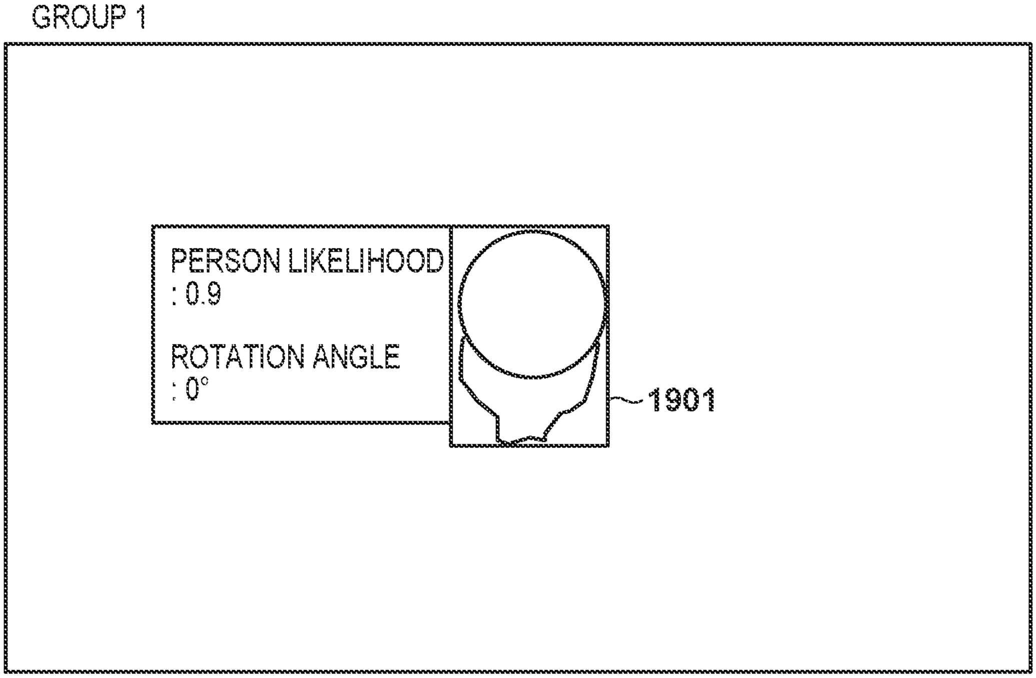
FIG. 22A is a schematic view illustrating grouping of a person detection result according to the third embodiment.
Figure 22B:
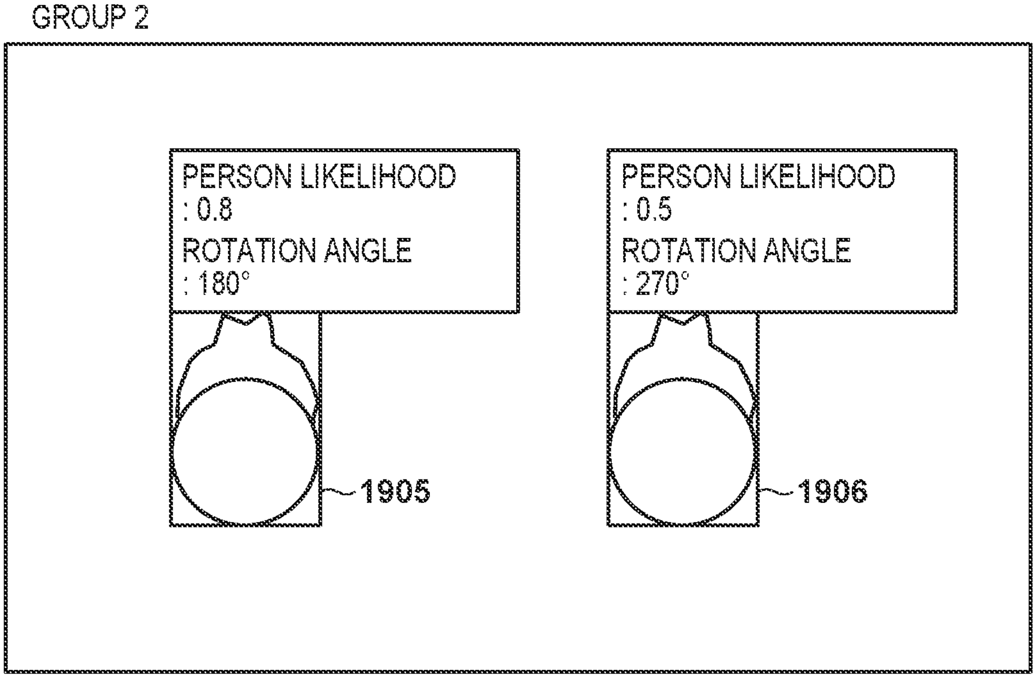
FIG. 22B is a schematic view illustrating grouping of a person detection result according to the third embodiment.

FIG. 15 is a flowchart illustrating the flow of processing according to the present embodiment. FIG. 16 is a diagram illustrating an example of a captured image according to the present embodiment. FIGS. 17A to 17D are schematic views illustrating a rotated image according to the present third embodiment. FIGS. 18A to 18D are schematic views illustrating a person detection result according to the present embodiment. FIGS. 19A to 19D are schematic views illustrating a pre-rotation person box according to the present embodiment. FIG. 20 is a schematic view illustrating an allocation map for when the area of the field of view of the image capture apparatus 105 according to the present embodiment is divided into a plurality (four in the illustrated example) of field of view regions. FIG. 21 is a schematic view illustrating a table in which each field of view region and the rotation angle for removal are associated with one another. The table is stored in the secondary storage apparatus 104, for example. FIGS. 22A and 22B are schematic views illustrating grouping of person detection results according to the present embodiment.

The process of detecting a person box of a person in an image according to the third embodiment will be described below with reference to FIGS. 14 to 22.

First, in step S301, the image obtaining unit 201 obtains a captured image by the image capture apparatus 105 using a fisheye lens. FIG. 16 illustrates an example of an image 1600 captured in this manner. The illustrated image 1600 shows two people, a person 1601 and a person 1602. Note that the number of people in the image may be any number such as zero or three or more people, and the number of people is not particularly limited.

In step S302, the rotation unit 202 executes processing to rotate the image 1600 obtained by the image obtaining unit 201 to generate rotated images 1701 to 1704 illustrated in FIGS. 17A to 17D.

In step S303, the person detection unit 203 performs person detection in accordance with a person detection method using the DNN described in Document "Wang" on the rotated images 1701 to 1704 obtained by the rotation unit 202 to generate person detection results 1801 to 1806 illustrated in FIGS. 18A to 18D. The detailed processing is the same as that in the first embodiment, and thus the description thereof will be omitted.

In step S304, the reverse rotation unit 204 converts (reverse-rotates) the person box of the person detection results 1801 to 1806 obtained by the person detection unit 203 into coordinates in the image 1600 on the basis of each rotation angle to generate pre-rotation person boxes 1901, 1905, and 1906 illustrated in FIGS. 19A to 19D.

In step S305, the allocation unit 1401 allocates the pre-rotation person boxes 1901 to 1906 obtained via reverse rotation processing by the reverse rotation unit 204 with a label from 1 to 4 depending on which label region of an allocation map 2000 (FIG. 20) the center coordinates of the person boxes correspond to. In this embodiment, the pre-rotation person boxes 1901 and 1903 are allocated the label 1 and the pre-rotation person boxes 1902 and 1904 to 1906 are allocated the label 3. Any number/position may be used for the number of labels and the position of the label regions, and the present embodiment is not limited by these.

In step S306, the removal unit 205 references a target removal rotation angle table 2100 (stored in a non-volatile memory) illustrated in FIG. 21 and removes the pre-rotation person boxes 1902 to 1904 which, from among the pre-rotation person boxes 1901 to 1906, have a rotation angle that corresponds to a rotation angle for removal corresponding to a label and has a person likelihood of less than a predetermined threshold (0.5). This example is merely an example, and the threshold can be any value such as 0.6 or 0.3 that is appropriate for the value range of person likelihood. Instead of removing a pre-rotation person box with a value less than a predetermined threshold, from among the pre-rotation person boxes with a rotation angle for removal, a pre-rotation person box outside of the highest ranking k may be removed. The rotation angle for removal may be any rotation angle, person detection may be applied to evaluation data, positive detection numbers for each rotation angle may be calculated, and a rotation angle for removal may be determined from the positive detection numbers. Any method can be used that can remove pre-rotation person boxes with a high false detection possibility from among the pre-rotation person boxes obtained from rotated images with a rotation angle with a few number of person boxes that can be detected. However, the present embodiment is not limited to these methods.

In step S307, the integration unit 206 calculates the evaluation index IoU between pre-rotation person boxes. As illustrated in FIGS. 22A and 22B, the person detection results corresponding to the pre-rotation person boxes with an evaluation index IoU equal to or greater than a predetermined threshold are grouped in groups of person detection results for the same person by the integration unit 206. The detailed processing for grouping is the same as that in the first embodiment, and thus the description thereof will be omitted. Lastly, the result with the highest person likelihood is selected from the grouped person detection results. The detailed processing for selecting the person detection result is the same as that in the first embodiment, and thus the description thereof will be omitted.

As described above, according to the third embodiment, for a captured image obtained by a fisheye camera, person detection is performed on rotated images of a plurality of rotation angles and person boxes with a high false detection possibility are removed from person boxes obtained from rotated images of different rotation angles according to the position in the image of the person box. According to the third embodiment, even when a person with the same orientation looks greatly different depending on the position in the image as in an image captured using a fisheye camera, a person box with a high possibility of a false detection can be removed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-072672, filed Apr. 26, 2023 which is hereby incorporated by reference herein in its entirety.

What is claimed is:

1. An image processing apparatus for detecting a person region representing a person in an image, comprising:
- one or more memories storing instructions; and
- one or more processors executing the instructions to:
  - obtain an image;
  - generate a plurality of rotated images by rotating an obtained image by a plurality of preset angles;
  - execute person detection processing on each one of the plurality of rotated images and obtain detection information including information indicating a candidate region of a detected person and information indicating a likelihood as a person in the candidate region; and
  - using detection information obtained via detection of the detected person, determine a candidate region to be removed from a person region in accordance with each likelihood and remove the candidate region,
- wherein, in removing the candidate region, the one or more processors further execute the instructions to:
  - categorize into corresponding candidate regions for each rotated image detected with the detection of the detected person;
  - calculate a difference between a maximum likelihood of a target candidate region categorized in the categorize and a likelihood of the target candidate region obtained from a rotated image with a rotation angle 180 degrees from that of a rotated image with the maximum likelihood;
  - compare the calculated difference and a preset threshold; and
  - when a result of the comparison indicate that the difference does not satisfy the threshold, remove the target candidate region from being a candidate for a person region.

2. The image processing apparatus according to claim 1, wherein in removing the candidate region, from among each detection information detected with the detection of the detected person, detection information not satisfying a preset highest ranking k (k being a natural number) is set for removal.

3. An image processing apparatus for detecting a person region representing a person in an image, comprising:
- one or more memories storing instructions; and
- one or more processors executing the instructions to:
  - obtain an image;
  - generate a plurality of rotated images by rotating an obtained image by a plurality of preset angles;
  - execute person detection processing on each one of the plurality of rotated images and obtain detection information including information indicating a candidate region of a detected person and information indicating a likelihood as a person in the candidate region;
  - using detection information obtained via detection of the detected person, determine a candidate region to be removed from a person region in accordance with each likelihood and remove the candidate region; and
  - capture an image targeted for the obtain using a fisheye lens,
- wherein the one or more memories store a table in which a plurality of divided field of view regions with a preset field of view area in the capture are associated with a rotation angle for removal, and
- wherein in removing the candidate region, the one or more processors further execute the instructions to
  - determine which pre-rotation field of view region a target candidate region detected with the detection of the detected person is located in and remove the target candidate region from being a candidate for a person region on a condition that a rotation angle for removal obtained by referencing the table and a rotation angle of a rotated image where the target candidate region exists match and a likelihood in the target candidate region is less than a preset threshold.

4. A control method for an image processing apparatus for detecting a person region representing a person in an image, comprising:
- obtaining an image;
- generating a plurality of rotated images by rotating an obtained image by a plurality of preset angles;
- executing person detection processing on each one of the plurality of rotated images and obtaining detection information including information indicating a candidate region of a detected person and information indicating a likelihood as a person in the candidate region; and
- using detection information obtained via detection of the detected person, determining a candidate region to be removed from a person region in accordance with each likelihood and removing the candidate region,
- wherein removing the candidate region comprises:
  - categorizing into corresponding candidate regions for each rotated image detected with the detection of the detected person;
  - calculating a difference between a maximum likelihood of a target candidate region categorized in the categorize and a likelihood of the target candidate region obtained from a rotated image with a rotation angle 180 degrees from that of a rotated image with the maximum likelihood;
  - comparing the calculated difference and a preset threshold; and
  - when a result of the comparison indicate that the difference does not satisfy the threshold, removing the target candidate region from being a candidate for a person region.

5. A non-transitory computer-readable storage medium storing a computer program that when read and executed by a computer provided in an image processing apparatus for detecting a person region representing a person in an image, causes the computer to obtain an image;

generate a plurality of rotated images by rotating an obtained image by a plurality of preset angles;

execute person detection processing on each one of the plurality of rotated images and obtain detection information including information indicating a candidate region of a detected person and information indicating a likelihood as a person in the candidate region; and using detection information obtained via detection of the detected person, determine a candidate region to be removed from a person region in accordance with each likelihood and remove the candidate region, wherein, in removing the candidate region, the program further causes the computer to:

categorize into corresponding candidate regions for each rotated image detected with the detection of the detected person;

calculate a difference between a maximum likelihood of a target candidate region categorized in the categorize and a likelihood of the target candidate region obtained from a rotated image with a rotation angle 180 degrees from that of a rotated image with the maximum likelihood;

compare the calculated difference and a preset threshold; and when a result of the comparison indicate that the difference does not satisfy the threshold, remove the target candidate region from being a candidate for a person region.

6. A control method for an image processing apparatus for detecting a person region representing a person in an image, comprising:

obtaining an image;

generating a plurality of rotated images by rotating an obtained image by a plurality of preset angles;

executing person detection processing on each one of the plurality of rotated images and obtaining detection information including information indicating a candidate region of a detected person and information indicating a likelihood as a person in the candidate region; and using detection information obtained via detection of the detected person, determining a candidate region to be removed from a person region in accordance with each likelihood and removing the candidate region, and capturing an image targeted for the obtain using a fisheye lens, wherein one or more memories store a table in which a plurality of divided field of view regions with a preset field of view area in the capture are associated with a rotation angle for removal, and wherein removing the candidate region comprises determining which pre-rotation field of view region a target candidate region detected with the detection of the detected person is located in and removing the target candidate region from being a candidate for a person region on a condition that a rotation angle for removal obtained by referencing the table and a rotation angle of a rotated image where the target candidate region exists match and a likelihood in the target candidate region is less than a preset threshold.

7. A non-transitory computer-readable storage medium storing a computer program that when read and executed by a computer provided in an image processing apparatus for detecting a person region representing a person in an image, causes the computer to obtain an image;

generate a plurality of rotated images by rotating an obtained image by a plurality of preset angles;

execute person detection processing on each one of the plurality of rotated images and obtain detection information including information indicating a candidate region of a detected person and information indicating a likelihood as a person in the candidate region; and using detection information obtained via detection of the detected person, determine a candidate region to be removed from a person region in accordance with each likelihood and remove the candidate region; and capture an image targeted for the obtain using a fisheye lens, wherein the program further causes the computer to store a table in which a plurality of divided field of view regions with a preset field of view area in the capture are associated with a rotation angle for removal, and wherein removing the candidate region comprises determining which pre-rotation field of view region a target candidate region detected with the detection of the detected person is located in and removing the target candidate region from being a candidate for a person region on a condition that a rotation angle for removal obtained by referencing the table and a rotation angle of a rotated image where the target candidate region exists match and a likelihood in the target candidate region is less than a preset threshold.

* * * * *